United States Patent [19]

Kucera et al.

[11] Patent Number: 4,864,502
[45] Date of Patent: Sep. 5, 1989

[54] SENTENCE ANALYZER

[75] Inventors: Henry Kucera, Providence, R.I.; Alwin B. Carus, Newton, Mass.

[73] Assignee: Houghton Mifflin Company, Boston, Mass.

[21] Appl. No.: 106,535

[22] Filed: Oct. 7, 1987

[51] Int. Cl.⁴ ............................................. G06F 15/38
[52] U.S. Cl. ..................................... 364/419; 364/900
[58] Field of Search ........................ 364/419, 900, 300

[56] References Cited

U.S. PATENT DOCUMENTS

| 4,584,667 | 4/1986 | Hashimoto | 364/419 |
| 4,633,435 | 12/1986 | Morimoto | 364/419 |
| 4,635,199 | 1/1987 | Muraki | 364/419 |
| 4,712,174 | 12/1987 | Minkler | 364/419 |
| 4,750,122 | 6/1988 | Kaji | 364/419 |
| 4,771,401 | 9/1988 | Kaufman | 364/419 |
| 4,773,009 | 9/1988 | Kucera | 364/200 |

OTHER PUBLICATIONS

*String Analysis of Sentence Structure,* Zellig S. Harris (1962), Mouton & Co., The Hague

*Primary Examiner*—Michael R. Fleming
*Attorney, Agent, or Firm*—Lahive & Cockfield

[57] ABSTRACT

An apparatus for the grammatical analysis of digitally encoded text material receives encoded text, annotates each word of the text with a tag, and processes the annotated text to identify basic syntactic units such as noun phrases and verb groups. A clausal analyzer then operates on the identified nominal and predicate structures to identify clause boundaries and clause types. During processing, feature agreement between parts of successively larger entities—noun phrases, predicates, and clauses—are successively derived. When an error is detected, an error maessage identifies the error and displays a suggested correction.

28 Claims, 11 Drawing Sheets

|   |   |   |
|---|---|---|
| . | SENTENCE CLOSER (PUNCTUATION TAG) | 01 |
| ( | OPEN PARENTHESIS (PUNCTUATION TAG) | 02 |
| * | "NOT" (ADVERBIAL TAG) | 03 |
| ) | CLOSE PARENTHESIS (PUNCTUATION TAG) | 04 |
| ; | SEMI-COLON (PUNCTUATION TAG) | 05 |
| - | DASH (PUNCTUATION TAG) | 06 |
| , | COMMA (PUNCTUATION TAG) | 07 |
| : | COLON (PUNCTUATION TAG) | 08 |
| ABL | PRE-QUALIFIER (PRE-NOMINAL TAG) | 09 |
| ABN | PRE-QUANTIFIER (PRE-NOMINAL TAG) | 10 |
| ABX | PRE-QUANTIFIER/DOUBLE CONJUNCTION (PRE-NOMINAL TAG) | 11 |
| AP | POST-DETERMINER (PRE-NOMINAL TAG) | 12 |
| AT | ARTICLE (PRE-NOMINAL TAG) | 13 |
| BED | "WERE" (VERBAL TAG) <F> | 14 |
| BEDZ | "WAS" (VERBAL TAG) <F> | 15 |
| BEG | "BEING" (VERBAL TAG) <N> | 16 |
| BEI | "BE"-BASE FORM (VERBAL TAG) <N> | 17 |
| BEM | "AM" (VERBAL TAG) <F> | 18 |
| BEN | "BEEN" (VERBAL TAG) <N> | 19 |
| BER | "ARE" (VERBAL TAG) <F> | 20 |
| BEZ | "IS" (VERBAL TAG) <F> | 21 |
| CC | COORDINATING CONJUNCTION (SENTENTIAL TAG) | 22 |
| CD | CARDINAL NUMBER (PRE-NOMINAL TAG) | 23 |
| CS | SUBORDINATING CONJUNCTION (SENTENTIAL TAG) | 24 |
| DOD | "DID" (VERBAL TAG) <F> | 25 |
| DOG | "DOING" (VERBAL TAG) <N> | 26 |
| DOI | "DO"-BASE FORM (VERBAL TAG) <N> | 27 |
| DON | "DONE" (VERBAL TAG) <N> | 28 |
| DOP | "DO" (VERBAL TAG) <N> | 29 |
| DOZ | "DOES" (VERBAL TAG) <F> | 30 |
| DT | SINGULAR DETERMINER (PRE-NOMINAL TAG) | 31 |
| DTI | SINGULAR/PLURAL DETERMINER (PRE-NOMINAL TAG) | 32 |
| DTS | PLURAL DETERMINER (PRE-NOMINAL TAG) | 33 |
| DTX | DETERMINER/DOUBLE CONJUNCTION (PRE-NOMINAL TAG) | 34 |
| EX | EXTISTENTIAL "THERE" (NOMINAL TAG) <P> | 35 |
| HVD | "HAD"; PAST TENSE (VERBAL TAG) <F> | 36 |
| HVG | "HAVING" (VERBAL TAG) <N> | 37 |
| HVI | "HAVE"-BASE FORM (VERBAL TAG) <N> | 38 |
| HVN | "HAD"; PAST PARTICIPLE (VERBAL TAG) <N> | 39 |
| HVP | "HAVE" (VERBAL TAG) <N> | 40 |
| HVZ | "HAS" (VERBAL TAG) <F> | 41 |
| IN | PREPOSITION (SENTENTIAL TAG) | 42 |
| JJ | ADJECTIVE (PRE-NOMINAL TAG) | 43 |
| JJR | COMPARATIVE ADJECTIVE (PRE-NOMINAL TAG) | 44 |
| JJS | SUPERLATIVE ADJECTIVE (PRE-NOMINAL TAG) | 45 |
| JJT | SEMANTIC SUPERLATIVE (PRE-NOMINAL TAG) | 46 |
| MD | MODAL AUXILARY (VERBAL TAG) <F> | 47 |

*FIG. 2*
(01 THRU 47)

| | | |
|---|---|---|
| NN | SINGULAR COMMON NOUN - BASE FORM (NOMINAL TAG) <N> | 48 |
| NN$ | POSSESSIVE SINGULAR COMMON NOUN (PRE-NOMINAL TAG) | 49 |
| NNS | PLURAL COMMON NOUN (NOMINAL TAG) <N> | 50 |
| NNS$ | POSSESSIVE PLURAL COMMON NOUN (PRE-NOMINAL TAG) | 51 |
| NNX | NON-POSSESSIVE COMMON NOUN - BASE FORM (NOMINAL TAG) <N> | 52 |
| NP | SINGULAR PROPER NOUN - BASE FORM (NOMINAL TAG) <N> | 53 |
| NP$ | POSSESSIVE SINGULAR PROPER NOUN (PRE-NOMINAL TAG) | 54 |
| NPS | PLURAL PROPER NOUN (NOMINAL TAG) <N> | 55 |
| NPS$ | POSSESSIVE PLURAL PROPER NOUN (PRE-NOMINAL TAG) | 56 |
| NR | SINGULAR ADVERBIAL NOUN - BASE FORM (NOMINAL TAG) <P> | 57 |
| NR$ | POSSESSIVE SINGULAR ADVERBIAL NOUN (PRE-NOMINAL TAG) | 58 |
| NRS | PLURAL ADVERBIAL NOUN (NOMINAL TAG) <P> | 59 |
| NRS$ | POSSESSIVE PLURAL ADVERBIAL NOUN (PRE-NOMINAL TAG) | 60 |
| OD | ORDINAL NUMBER (PRE-NOMINAL TAG) | 61 |
| PN | NOMINAL PRONOUN (NOMINAL TAG) <P> | 62 |
| PN$ | POSSESSIVE NOMINAL PRONOUN (PRE-NOMINAL TAG) | 63 |
| PP$ | POSSESSIVE PRONOUN (PRE-NOMINAL TAG) | 64 |
| PP$$ | SECOND POSSESSIVE PRONOUN (NOMINAL TAG) <P> | 65 |
| PPL | SINGULAR REFLEXIVE PRONOUN (NOMINAL TAG) <P> | 66 |
| PPLS | PLURAL REFLEXIVE PRONOUN (NOMINAL TAG) <P> | 67 |
| PPO | OBJECTIVE PERSONAL PRONOUN (NOMINAL TAG) <P> | 68 |
| PPS | THIRD PERSON NOMINATIVE PERSONAL PRONOUN (NOMINAL TAG <P> | 69 |
| PPSS | NON-THIRD PERSON NOMINATIVE PERSONAL PRONOUN (NOMINAL TAG) <P> | 70 |
| PPX | NON-POSSESSIVE PERSONAL PRONOUN (NOMINAL TAG) <P> | 71 |
| QL | QUALIFIER (PRE-NOMINAL TAG) | 72 |
| QLP | POST-QUALIFIER (PRE-NOMINAL TAG) | 73 |
| RB | ADVERB (ADVERBIAL TAG) | 74 |
| RBR | COMPARATIVE ADVERB (ADVERBIAL TAG) | 75 |
| RBT | SUPERLATIVE ADVERB (ADVERBIAL TAG) | 76 |
| RN | NOMINAL ADVERB (ADVERBIAL TAG) | 77 |
| RP | ADVERB/PARTICLE (ADVERBIAL TAG) | 78 |
| TO | INFINITIVAL "TO" (VERBAL TAG) <(IN)> | 79 |
| UH | EXCLAMATION (SENTENTIAL TAG) | 80 |
| VBD | VERB PAST TENSE FORM (VERBAL TAG) <F> | 81 |
| VBG | VERB PRESENT PARTICIPLE (VERBAL TAG) <N> | 82 |
| VBI | VERB INFINITIVE - BASE FORM (VERBAL TAG) <N> | 83 |
| VBN | VERB PAST PARTICIPLE (VERBAL TAG) <N> | 84 |
| VBP | VERB NON-THIRD PERSON SINGULAR, PRESENT TENSE (VERBAL TAG) <N> | 85 |
| VBZ | VERB THIRD-PERSON SINGULAR, PRESENT TENSE (VERBAL TAG) <F> | 86 |
| WDT | WH-DETERMINER (PRE-NOMINAL TAG) | 87 |
| WP$ | PERSONAL WH-PRONOUN (PRE-NOMINAL TAG) | 88 |
| WPO | OBJECTIVE WH-PRONOUN (NOMINAL TAG) <P> | 89 |
| WPS | NOMINATIVE WH-PRONOUN (NOMINAL TAG) <P> | 90 |
| WQL | WH-QUALIFIER (PRE-NOMINAL TAG) | 91 |
| WRB | WH-ADVERB (ADVERBIAL TAG) | 92 |
| XX | - PARSER INTERNAL - NO TAG ASSIGNED - | 93 |
| ZZZZ | END-OF-FILE MARKER | 94 |

*FIG. 2*
(48 THRU 94)

LIST OF MAJOR CLASS HEADERS FOR TAGS

| Class | Description | Tags | EG Code |
|---|---|---|---|
| AB | pre-qualifiers and pre-quantifiers | 3 | 4 |
| AP | post determiner | 1 | 4 |
| AT | article | 1 | 4 |
| BE | forms of the verb "to be" | 8 | 2,3 |
| CC | coordinating conjunction | 1 | 6 |
| CD | cardinal number | 1 | 4 |
| CS | subordinating conjunction | 1 | 6 |
| DO | forms of the verb "to do" | 6 | 2,3 |
| DT | determiners | 4 | 4 |
| EX | existential "there" | 1 | 1 |
| HV | forms of the verb "to have" | 6 | 2,3 |
| IN | preposition | 1 | 6 |
| JJ | adjectives | 4 | 4 |
| MD | modal auxiliary | 1 | 3 |
| NN | common nouns | 5 | 1,4 |
| NP | proper nouns | 4 | 1,4 |
| NR | adverbial nouns | 4 | 4 |
| OD | ordinal number | 1 | 4 |
| PN | nominal pronouns | 2 | 1,4 |
| PP | personal pronouns | 8 | 1,4 |
| QL | qualifiers | 2 | 4 |
| RB | adverbs | 3 | 6 |
| RN | nominal adverb | 1 | 6 |
| RP | adverb/particle | 1 | 6 |
| TO | infinitival "to" | 1 | 6 |
| UH | exclamation | 1 | 6 |
| VB | verbs | 6 | 2,3 |
| WD | wh-determiner | 1 | 4 |
| WP | personal wh-pronouns | 3 | 1,4 |
| WQ | wh-qualifier | 1 | 4 |
| WR | wh-adverb | 1 | 6 |
| XX | none of the above (GCS-internal only) | 1 | . |

*FIG. 3*

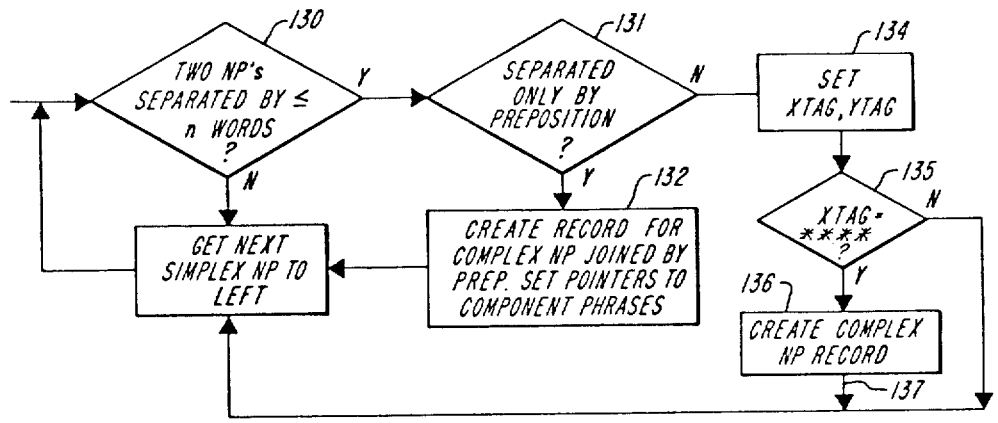

FIG. 6

PREDICATIONAL TAG GROUP NUMBER ASSIGNMENTS

| TG Nbr. | Tag(s) | Examples |
|---|---|---|
| 1 | BEI | be |
| 2 | BED, BEDZ, BEM, BER, BEZ | was, were, am, are, is |
| 3 | BEG | being |
| 4 | BEN | been |
| 5 | DOI | do (infinitive) |
| 6 | DOD, DOZ, DOP | did, does, do (finite form) |
| 7 | HVI | have (infinitive) |
| 8 | HVD, HVZ, HVP | had (past tense form), has, have (finite form) |
| 9 | HVG | having |
| 10 | HVN | had (past participle) |
| 11 | MD | would, could, should, etc. |
| 12 | VBI | see (infinitive), etc. |
| 13 | VBD, VBZ, VBP | saw, sees, see (finite form), etc. |
| 14 | VBG, DOG | seeing, doing, etc. |
| 15 | VBN, DON | seen, done, etc. |
| 16 | TO | infinitival to |
| 17 | RB, RBR, RBT, RP, | unrestricted adverbial tags |
| 18 | [NP | automatically assigned to the first word of an NP consisting of two or more words |
| 19 | NP] | automatically assigned to the last or only word of an NP |
| 20 | anything else | automatically assigned to any word not covered by the above classifications |

FIG. 7

SAMPLE PREDICATIONS

| Length | Template |
|---|---|
| 1 | (have, has, had) |
| 2 | (have, has, had) (been, done, had, seen) |
| 3 | (have, has, had) been (being, doing, done, having, seeing, seen) |
| 4 | (have, has, had) been, being (done, seen) |
| 1 | would |
| 2 | would (be, do, have, see) |
| 3 | would be (being, doing, done, having, had, seeing, seen) |
| 4 | would be being (done, seen) |
| 3 | would have (been, done, had, seen) |
| 4 | would have been (being, doing, done, having, seeing, seen) |
| 5 | would have been being (done, seen) |

FIG. 8

SAMPLE PREDICATIONAL TEMPLATES (BY TAGS)

| Length | Template |
|---|---|
| 1 | (HVP, HVZ, HVD) |
| 2 | (HVP, HVZ, HVD) (BEN, DON, HVN, VBN) |
| 3 | (HVP, HVZ, HVD) BEN (BEG, DOG, DON, HVG, VBG, VBN) |
| 4 | (HVP, HVZ, HVD BEN BEG (DON, VBN) |
| 1 | MD |
| 2 | MD (BEI, DOI, HVI, VBI) |
| 3 | MD BEI (BEG, DOG, DON, HVG, HVN, VBG, VBN) |
| 4 | MD BEI BEG (DON, VBN) |
| 3 | MD HVI (BEN, DON, HVN, VBN) |
| 4 | MD HVI BEN (BEG, DOG, DON, HVG, VBG, VBN) |
| 5 | MD HVI BEN BEG (DON, VBN) |

FIG. 9

SAMPLE PREDICATIONAL TEMPLATES (BY TG NUMBERS)

| Length | A  | B          | C              | D           | E  |
|--------|----|------------|----------------|-------------|----|
| 1      | 3  |            |                |             |    |
| 2      | 3  | (4,10,15)  |                |             |    |
| 3      | 3  | 4          | (3,9,10,14,15) |             |    |
| 4      | 3  | 4          | 3              | 15          |    |
| 1      | 11 |            |                |             |    |
| 2      | 11 | (1,5,7,12) |                |             |    |
| 3      | 11 | 1          | (3,9,10,14,15) |             |    |
| 4      | 11 | 1          | 3              | 4           |    |
| 3      | 11 | 7          | (4,10,15)      |             |    |
| 4      | 11 | 7          | 4              | (3,9,10,14,15) |  |
| 5      | 11 | 7          | 4              | 3           | 15 |

FIG. 10

SAMPLE PREDICATIONAL TEMPLATES (FSA REPRESENTATION)

| Max.Len. | A  | B       | C           | D           | E  |
|----------|----|---------|-------------|-------------|----|
| 2        | 3  | (10,15) |             |             |    |
| 3        | 3  | 4       | (9,10,14,15)|             |    |
| 4        | 3  | 4       | 3           | 15          |    |
| 2        | 11 | (5,12)  |             |             |    |
| 3        | 11 | 1       | (9,10,14,15)|             |    |
| 4        | 11 | 1       | 3           | 4           |    |
| 3        | 11 | 7       | (10,15)     |             |    |
| 4        | 11 | 7       | 4           | (9,10,14,15)|    |
| 5        | 11 | 7       | 4           | 3           | 15 |

FIG. 11

FSA CONFIGURATION STORAGE STRUCTURE

```
1 FSA-DESC BASED (FD-STR.),
  2 LINK-PTR PTR INIT(NULL)
  2 OST-NBR FIXED BIN(15)
  2 NST-NBR FIXED BIN(15)
  2 TAG-NBR FIXED BIN(15)
  2 CUR-PARSE FIXED BIN(15)
  2 MIGHT-START-VG FIXED BIN(15)
  2 CUR-NP-COUNT FIXED BIN(15)
  2 CUR-VG-COUNT FIXED BIN(15)
  2 CUR-SEN-COUNT FIXED BIN(15)
  2 CUR-LEVEL FIXED BIN(15)
  2 FINITE-PRED BIT(1)
  2 NP-FLAG BIT(1)
  2 VG-FLAG BIT(1)
  2 V-FEAT BIT(8)
  2 FILLER(5)BIT(1)
```

FIG. 12

| | BEI | BEF | BEG | BEN | DOI | DOF | HVI | HVF | HVG | HVN | MD | VBI | VBF | VBG | VBN | TO | RB | GNP | XX |
|---|---|---|---|---|---|---|---|---|---|---|---|---|---|---|---|---|---|---|---|
| STATE 1 | 24, | 4, | 42, | 21, | 5, | 5, | 6, | 6, | 42, | 6, | 3, | 24, | 39, | 42, | 39, | 42, | 1, | 7, | 1, |
| STATE 7 | 0, | 13, | 0, | 0, | 2, | 14, | 2, | 15, | 0, | 49, | 12, | 2, | 32, | 0, | 49, | 0, | 7, | 31, | 0, |
| STATE 14 | 28, | 0, | 0, | 0, | 32, | 33, | 32, | 33, | 0, | 0, | 0, | 32, | 33, | 0, | 33, | 0, | 14, | 35, | 0, |
| STATE 32 | 27, | 13, | 0, | 27, | 27, | 14, | 27, | 15, | 0, | 27, | 12, | 27, | 27, | 0, | 27, | 26, | 32, | 35, | 32, |
| STATE 35 | 45, | 45, | 0, | 35, | 45, | 45, | 45, | 45, | 0, | 45, | 45, | 45, | 37, | 0, | 45, | 26, | 35, | 35, | 35, |

FIG. 12A

SENTENCE ANALYZER

The present invention relates to automated language analysis systems, and relates to such systems embodied in a computer for receiving digitally encoded text composed in a natural language, and to systems for the grammatical analysis of encoded text.

In recent years a number of systems have been developed for the automated recognition of syntactic information. A survey of some systems appears in the textbook of Winograd, *Language as a Cognitive Process - Syntax* (ISBN 0-201-08571-2 v. 1) at pages 357-361 and pages 390-403. As a rule, although a number of theoretical linguistic formalisms have been developed to identify correct grammatical constructions, the practical construction of grammatical analyzing devices has proven difficult. Because the number of combinations of possible parts of speech for a string of words escalates exponentially with string length, syntax-recognizing systems have in general been limited to operating on text having a small, well-defined vocabulary, or to operating on more general text but dealing with a limited range of syntactic features. Extensions of either vocabulary or syntactic range require increasingly complex structures and an increasing number of special recognition rules, which would make a system large or too unwieldy for commercial implementation on commonly available computing systems. Moreover, the automated grammatical systems which have been designed are special processors, in that they are not adapted to conventional word processing or computer-aided publishing functions. For example, such systems may require that their input text be at least sufficiently pre-edited so that it is both correctly spelled and grammatically well formed. Text having a misspelling, a wrong word such as a homonym, a compound word, or even a simple syntax error may render an input sentence unanalyzable.

OBJECTS AND SUMMARY OF THE INVENTION

It is an object of the present invention to provide an improved device for the grammatical analysis of digitally encoded natural language text.

It is another object of the invention to provide a digital text analyzer which associates a tag with each word of a digitally encoded text and processes the tags to identify higher grammatical structure.

It is another object of the invention to provide a text analyzer operative on tagged text which successively identifies noun groups, then predicates and then clausal structures.

These and other features of the invention are obtained in an apparatus for the grammatical analysis of digitally encoded text material which receives encoded text, annotates each word of the text with a tag, and processes the annotated text to identify basic syntactic units such as noun phrases and verb groups. A clausal analyzer then operates on the identified nominal and predicate structures to identify clause boundaries and clause types. When an error is detected, an error message identifies the error and displays a suggested correction.

BRIEF DESCRIPTION OF THE DRAWINGS

FIG. 2 is a listing of system tags in an illustrative embodiment;

FIG. 3 is a simplified listing of classes of tags;

FIGS. 5 and 6 are flow charts of the noun phrase processing of tagged text sentences;

FIG. 7 shows verbal tag processing indices;

FIGS. 8-11 show predicational templates;

FIG. 12 is a descriptive structure for a predicate-analyzing FSA;

FIG. 12A is a state transition table for one such FSA;

DETAILED DESCRIPTION OF THE DRAWINGS

Figure 1:
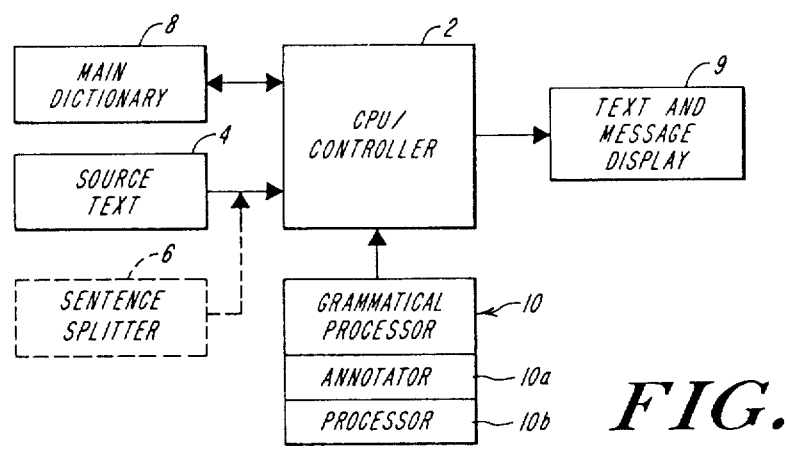
FIG. 1 is a block diagram of a system according to the present invention.

FIG. 1 shows a block diagram of a grammatical analyzer according to the present invention having a CPU/controller 2 which may, for example, be a general purpose computer such as a micro- or mini- computer having storage of at least several megabytes and sufficient (e.g. 640 kilobytes) random access memory. The computer receives input text 4, e.g., from keyboard entry, a communications link, or a data storage device, and, if necessary, runs a sentence splitter 6 which partitions the text into sentences for grammatical analysis. Alternatively, the system may receive as input discrete sentences of encoded text with sentence boundary markers inserted. Sentence splitting per se is known in the art, and is used, for example, in computerized readability analysis systems for deriving word-per-sentence and similar statistical information. A suitable sentence splitter is disclosed in U.S. Pat. No. 4,773,009 of Henry Kucera, Rachael Sokolowski and Jacqueline Russom filed June 6, 1986 as Ser. No. 872,094 entitled Method and Apparatus for Text Analysis.

The controller 2 then passes each sentence to a grammatical analyzer 10, which processes the sentences to determine higher grammatical structure and to detect errors. Analyzer 10 includes an annotator 10a which annotates each word of the sentence, e.g., by reference to a stored word dictionary 8, so as to produce an annotated sentence structure. Analyzer 10 also includes a processing module 10b which operates on the annotated structure to define noun and verb groups, and to define clausal and sentence structure. The annotated sentence, or partial parses thereof and error messages or "prompts", are displayed on display 9.

The dictionary includes a record for each word which contains a list of "tags", each tag encoding a syntactic or inflectional property of the word, and which also contains a list of special features used in the grammatical processing. The processor annotates the sentence words with this information. It further preprocesses the annotated sentences to identify a single most likely tag for each word. Such tags may be identified by employing a number of common template-matching rules to quickly scan sets of tags and identify tags which fit common syntactic patterns. Preferably, however, the single tag for each word is identified using probabilistic data defined on the sets of possible tags, as described in the research on collocational tagging published by Ian Marshall, or as set forth in the patent application Ser.

No. 106,127 of Henry Kucera, Alwin Carus and Jeffrey Hopkins for Collocational Grammar System filed on the same date as this patent application.

A prototype processor was constructed with the tag annotations provided by a main dictionary with 28,223 80-byte records, each having the complete grammatical information for a given "word". Each dictionary "word" was either a base form from which various inflections are recovered through a coding and analysis technique, or an irregularly inflected form. The records included, an addition to the base form, a list of codes for "tags" indicative of all the grammatical or syntactic uses that the linguistic words derivable from the base form may assume, and further, for noun and verb words, a list of "inflection codes" which encode inflectional paradigms for generating the noun or verb inflections from the base form.

FIG. 2 is a listing of the tags used in the prototype embodiment, each of which is represented in the drawing by a one to three character mnemonic and also by a one to two digit tag code. There are ninety-three such tags, although any given text word will generally have between one and six possible tags. Each tag indicates a possible syntactic use of the word, or an inflection. The dictionary records preferably also include, for nouns and verbs, certain information encoding word features such as its number agreement behavior.

FIG. 3 shows a simpler list of tag classes, which for many of the processing steps discussed below provide all necessary information. There are thirty-two such classes. The Figure gives the class code in column one, a class description in column two, and the number of tags in the class in column three. Column four contains an "exclusive group" or "EG" number, used in connection with verbal processing as described further below.

As noted above, the dictionary is used in connection with appropriate "unflection" processing modules which analyze a text word to determine its base form and look up the base form in the dictionary to retrieve its listed tags. Related "inflection" processing, conversely, generates a given inflection from its base form and from a data code indicative of the inflectional paradigm.

One suitable unflection/inflection processor is described in detail in U.S. Pat. No. 4,724,523 and entitled "Method and Apparatus for the Electronic Storage and Retrieval of Expressions and Linguistic Information" of inventor Henry Kucera. The disclosure of that patent application is hereby incorporated by reference. For purposes of the present invention however, what is important is that text material be annotated to identify for each word of a sentence tags indicating its possible uses. The data for each word is then contained in a data structure denoted a sentence node or SEN-NODE below. In the discussion below it will further be assumed that each SEN-NODE includes an indication of a single tag, denoted "MPP", which has initially been selected as the most likely tag for the word represented by that node.

Parsing of Annotated Sentence

Figure 4:
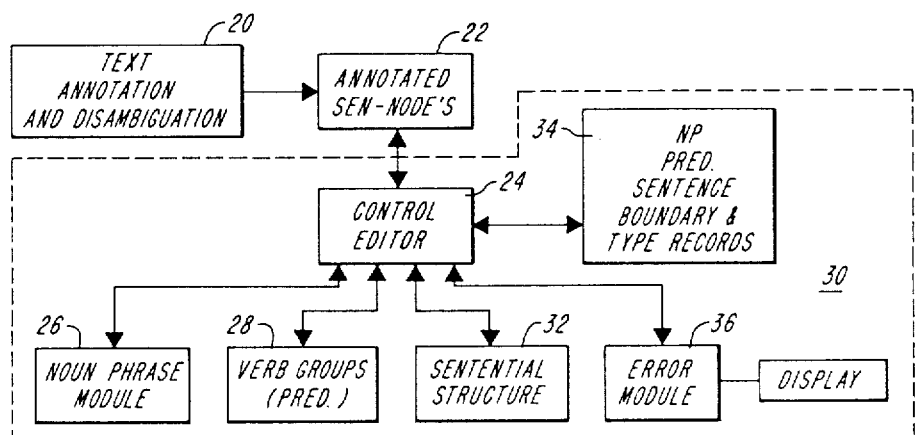
FIG. 4 shows the processing of a general grammatical analyzer operative on tagged text.

FIG. 4 shows the construction of an exemplary grammatical text analyzer according to the invention, in which, by way of illustration, a disambiguation processor 20 provides a data output including a SEN NODE data structure 22 for each word, with its most probable tag, denoted MPP, and other tag and feature annotations. A grammatical analyzer 30 then operates under control of control module 24 on the annotated word data to successively build up larger syntactic structures and derive a parse of a text sentence.

In this construction, the set of tagged sentence nodes is parsed in three general phases: (a) the identification of the simplex noun phrases (NPs) in the sentence, and if there is more than one simplex NP, their combination, where possible, into complex NPs; (b) the identification of the simplex verb groups (VGs) in the sentence and, if there is more than one simplex VG, their combination, where possible, into complex VGs; and (c) the identification of the simplex sentence(s) (or clauses) in the (matrix) sentence and, if there is more than one simplex sentence their combination (where possible) into complex sentences.

The NP processing 26 of the first phase is accomplished in a double-scan of the sentence. The parser first ascertains NP boundaries primarily by inspecting tagged words and applying ordering criteria to their "rank". This rank, which characterizes a word's functional role in noun phrase construction, is determined by inspection of the word's tag in conjunction with other data, which may be stored in the word's sentence node. It then operates on the simplex NP structures to detect complex phrases which include prepositional phrases, a coordinating conjunction, certain coordinating punctuation and appositions. When such a complex phrase is identified, the processor creates a complex NP record which includes pointers to the component NPs and the boundaries of the NP, and derives the feature agreement properties, e.g., number, of the complex NP.

Once the NP-structure of the sentence has been determined, a predication analyzer module 28 inspects the portions of the sentence that are not incorporated into nominalizations, and assigns predicational structure to these portions where appropriate.

After operation of module 28, the predicational structure of the sentence has been provisionally determined. Some sentential structure is also determined incident to the predicational analysis, as tentative assignments of subjects and their corresponding finite predications will have been made.

At this point the controller 24 analyzes the higher syntactic structure of the sentence by a clausal analysis module 32 that inspects the tentative sentence-level structures generated by module 28 and either confirms them or replaces them.

The noun group and verb group modules each insert boundary markers and provide other data to appropriate registers 34 which maintain the boundary data for phrase and verb groups, and also maintain the derived feature information. This allows concordance rule checking of different syntactic units and permits the clausal analysis module to match related sub-units of clauses. An error message module 36 displays error messages when errors of syntax are detected.

When agreement errors are detected, the correct noun and verb inflections are generated from the base form, by an "inflection" procedure, and are displayed with a corresponding error message as suggested corrections.

Determination of Noun Phrases

Figure 5:
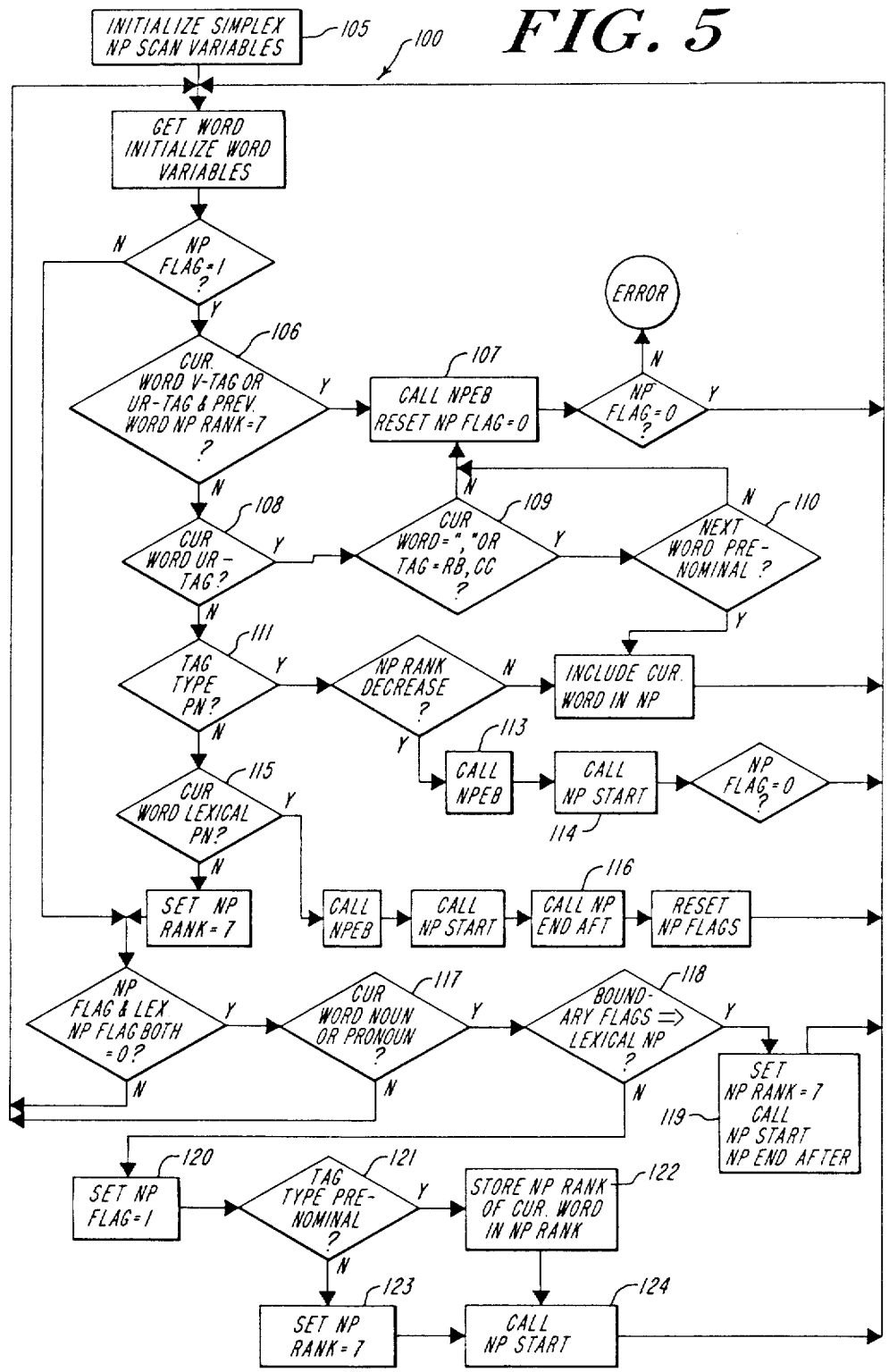

The initial noun phrase processing of the parsing module will be understood by reference to the flow charts, FIGS. 5 and 6.

First, for each pre-nominal tag, a "rank" is associated corresponding to its functional position in noun phrase construction. Thus, pre-qualifiers and pre-quantifiers have rank 0; determiners, articles and possessives have rank 1; post-determiners (tag AP) have rank 2; cardinal and ordinal numbers rank 3; comparative and superlative adjectives, adverbs, qualifiers, and semantic superlatives such as "top" have rank 4; adjectives have rank 5; and post-qualifiers rank 6. With such information available from the tag of each word, noun phrase determination is then accomplished as follows.

As shown in FIG. 5. upon entry at step 105, the noun phrase processing module, which in the prototype system is part of a module denoted GcsPrsr initializes a number of processing variables for the simplex-NP scan. The variables and flag bits are evaluated or ascertained during processing and their values loaded into a data structure NGROUPS which serves as a record of noun phrase data generated by the processing. These variables are: (a) NP-COUNT (the location in NGROUPS of the NP currently under construction—if any—or the next available slot where one can be constructed), which is set to 1; (b) NP-FLAG (an NP scope flag), which is set to '0'B to indicate no NP is presently under construction; (c) SN-PTR (a basing pointer for the SEN-NODE structure), which is set to point at the SEN-NODE that corresponds to the first word in the sentence; (d) N-CPNTS (a complex-NP endpoints array in NGROUPS), which is set to zero, and (e) N-DOM-LK (an NP-domination link array in NGROUPS), which is also set to zero).

The structure NGROUPS is an external data array of 16-byte structures for containing information concerning simplex and complex noun phrases; elements accessed by the GcsPrsr are: (a) N-SPNTS (which contains the starting and ending points for each noun phrase in NGROUPS); (b) N-CPNTS (which contains the starting and ending points for each complex noun phrase in NGROUPS); (c) N-PREPS (which contains the location of the preposition (if any) that dominates a given noun phrase); (d) N-DOM-LK (which contains the identity of the complex-NP node (if any) that dominates a given NP); (e) N-FEATS (which contains the identity of the nominal features associated with the head noun (if any) in a given simplex NP); and (f) N-WEIGHT (which contains the "weight" of the given NP, calculated as described below).

After initialization, denoted 100, the NP processor enters a simplex-NP scan loop, which iterates through the chain of SEN-NODE structures containing the syntactic representation of the current sentence, including the most likely tag of each word, and groups as many nominal and pre-nominal elements as possible into simplex noun phrases satisfying certain ordering and recognition criteria of NP well-formedness. This process calls to three sub-procedures, designated (i) NP-START, (ii) GcsNPEB, and (iii) NP-END-AFTER. Each of these inserts an NP boundary and updates the NGROUPS structure as described below.

For each iteration of the simplex-NP scan loop, the following variables are set according to the contents of the SEN-NODE structure currently under consideration: (a) CUR-PARSE is set equal to the index in the portion of the SEN-NODE array that contains the MPP tag of the current word; (b) TAG-TYPE is set equal to the code that describes the general tag class of this tag; (c) TAG is set equal to the character representation of this tag for purpose of display, if required; (d) CUR-FLAGS is set equal to a bit string that contains the features corresponding to the MPP tag; and (e) WORD is set equal to the current word. After the above variables have been set, the value of a lexical-NP recognition flag (LEX-NP-FLAG) is initialized to '0'B, and the value of NP-FLAG is then inspected. If NP-FLAG is set to '1'B (indicating that an NP is already under construction), then the following actions are taken in order to determine if the current element will close this NP (either with or without starting a new NP).

A check 106 determines if (1) the first letter of the current word's tag type stored in TAG-TYPE is equal to "V" (indicating that this word is a verb); or (2) the tag type is "UR" (indicating an "unrestricted" tag) and the NP rank of the previous word was 7 (a rank assigned by GcsPrsr when it identifies a word as a head noun or a pronoun). If so the parsing processor at 107 calls the external procedure (GcsNPEB) in order to insert a noun phrase end boundary marker, closing the current NP with its last word the word before the current word; and resets the value of NP-FLAG bit to '0'B.

Otherwise at 108 if the tag type is "UR" (and therefore the NP rank of the previous word is not 7), a check 109 determines if (1) the current element of the sentence is a comma, or (2) the MPP tag of this element is "RB" or "CC". If either condition holds, then: the tag type of the element following the current one is inspected at 110, and if this word is not pre-nominal, GcsNPEB is called in order to close the current NP with its last word being the word before the current word; and the value of NP-FLAG is reset to '0'B. Otherwise, that is, if the next word is a pre-nominal, the current word is included in the NP currently under construction.

On the other hand, if the tag type is "UR" but neither of conditions (1) or (2) given above holds, then GcsNPEB is called directly to close the current NP with its last word being the word before the current word, and the value of NP-FLAG is reset to '0'B.

If the current word's tag is neither verbal nor unrestricted, then this word may either end or be added to the current NP (and in the former case will start a new NP if the current word is a pronoun), so the tag type of this word is next inspected at stage 111 and the following actions are taken.

If the tag type is "PN" (indicating that the word is functioning as a pre-nominal), then at step 111 the NP rank of the current word is obtained and is compared at 112 with the NP rank of the previous word. If the current NP rank is less than the NP rank of the previous word, then, except in special cases, the boundary marker inserting routine GcsNPEB is called at step 113 in order to close the current NP with its last word being the word before the current node. Also the procedure NP-START is called at step 114 in order to start a new NP with the current word as its first element. NP-START modifies the simplex-NP endpoints array N-SPNTS in the processing structure NGROUPS to set the opening boundary of the current NP equal to the location of the current word in the sentence, and modifies a prepositional phrase marker N-PREPS in NGROUPS by inspecting the word previous to the start of the NP, and, if it is a preposition, setting the phrase marker to its address, thus marking the current simplex NP as a potential prepositional phrase. NP-START also sets an "open-NP" boundary flag on the current SEN NODE structure.

It should be noted that this processing may be refined in various ways. For example, detection of an NP rank decrease at step 112 may legally occur within a noun phrase in constructions such as "A good, highly regarded, book" in which an adverb (rank 4) follows one of a series of adjectives (rank 5). However, in normal circumstances during NP construction, the occurrence of a pre-nominal word of lesser NP rank than the preceding word is generally recognized as the start of a new noun phrase.

Otherwise, if at step 115 an inspection of the NP-boundary flags associated with the current word indicates that it is being interpreted as a lexical NP, then the following actions are taken: (i) GcsNPEB is called in order to close the current NP with its last word the word before the current word; (ii) NP-START is called in order to start the new NP with the current word as its first element; (iii) NP-END-AFTER is called at 116 in order to end the new NP with the current word as its last element; (iv) NP-FLAG is reset to '0'B in order to indicate that the current NP cannot be added to on the right; and (v) LEX-NP-FLAG is set to '1'B in order to indicate that the current NP is a lexical NP.

If the current word is not a lexical NP, then it is necessarily either a head noun or a noun adjunct, so the value of NP-RANK is set equal to 7.

At this point the values of both NP-FLAG and LEX-NP-FLAG are checked and if they are both equal to '0'B, indicating that the current word has not been processed yet by either adding it to an existing NP or by interpreting it as a lexical NP, then the following actions are taken.

If an inspection 117 of the word's tag type indicates that it is a noun or pronoun, then if an inspection of 118 of the NP-boundary flags associated with the current word indicates that it is being interpreted as a lexical NP, then the following actions are taken at 119: (i) the value of NP-RANK is set equal to 7; (ii) NP-START is called in order to start the new NP with the current word as its first element; and (iii) NP-END-AFTER is called in order to end the new NP with the current word as its last element.

Otherwise the NP currently being opened may have more than one element in it. For example, even if it begins with a noun, this noun may turn out to be an adjunct to one or more further nouns in the NP. Thus, the following processing is done. At step 120 NP-FLAG is set equal to '1'B and at 121 a check determines if the tag type is "PN" (indicating that the word is functioning as a pre-nominal). If so, then at 122 the NP rank of the current word is obtained and stored in the various NP-RANK.

Otherwise the current word is necessarily a noun, so at 123 NP-RANK is set equal to 7, and NP-START is called in order to set up the necessary environment for processing the simplex NP that was started in either Step 122 or 123 above.

Above the above steps have been completed, the value of NP-FLAG is insected; if it is set to '1'B, then the next word to be processed may possibly be added onto an NP that is currently under construction, so PREV-NP-RANK is set equal to NP-RANK; otherwise it is set equal to zero. The value of SN-PTR is then set to access the SEN-NODE corresponding to the next element of the sentence in the next iteration of the loop, and if this SEN-NODE is active in the current sentence, then the above procedure is repeated.

During the noun phrase processing described in detail with reference to FIG. 5, the processing routines NPEB and NP-END-AFTER are invoked (e.g., as described at steps 124 and 113 of FIG. 5) to construct an appropriate noun phrase storage entry and to insert a "close-NP" boundary before (respectively, after) the current word. These processing routines operate as follows.

The routine NP-END-AFTER modifies the NGROUPS array of structures which is the aggregate containing information concerning simplex and complex noun phrases by (a) modifying the simplex-NP endpoints array N-SPNTS in order to set the extent of the current NP. These endpoints are both set equal to the address of the current word in the overall sentence processing structure SEN-TBL since the NP-END-AFTER procedure is only invoked for lexical NP'S. It also modifies (b) the NP-feature string array N-FEATS by setting the slot that is indexed by the curren value of NP-COUNT equal to CUR-FLAGS which contains a copy of the current noun feature string; and modifies (c) the NP-weight array N-WEIGHT by setting the slot that is indexed by the current value of NP-COUNT equal to the appropriate lexical-NP value. Specifically, it sets the "NP-WEIGHT" corresponding to the current lexical NP equal to: (i) +2 (a default value for singular lexical NPs), or (ii) −2 (a default value for plural lexical NPs); or (iii) 0 (a default value for NPs that are neutral with respect to number agreement). Finally, NP-END-AFTER closes the NP currently under construction by incrementing the current NP counter variable (NP-COUNT) in the external sentence-ordering structure by one, and then returns to its calling procedure.

The processing routine GcsNPEB, which is invoked when a noun phrase is determined to have ended before the current word, inserts a close-NP boundary before the current word, and also checks the internal structure of the NP by inspecting the features of its individual elements, and, if inconsistencies are detected, initiates corrective processing.

On entry, GcsNPEB sets the feature string for the simplex NP currently under construction equal to the feature string corresponding to the word preceding the current word in SEN-TBL, and then sets the simplex-NP closing boundary equal to the address of that word (in SEN-TBL). In addition to this processing, GcsNPEB of the prototype embodiment also checks the internal number agreement consistency of the NP it has created by inspecting its features, as follows.

First of all, a loop inspects each SEN-NODE within the scope of the given simplex NP (i.e., those SEN-NODE's between and including the nodes specified by the endpoints stored in NGROUPS.N-SPNTS). Each SEN-NODE in this range that does not correspond to a word whose MPP tag indicates that it is most probably functioning as a noun adjunct is inspected to see whether its MPP tag carries features that are not neutral with respect to number agreement. Further processing is done for each of these words that is not a noun adjunct and is also not neutral with respect to number agreement, as follows. If the word is plural, then a plural counter (PL-CTR) is incremented by one and the location of the word (in SEN-TBL) is stored in the element of the plural storage matrix (PL-TBL) that as indexed by PL-CTR; similarly, if the word is singular, then a singular counter (SG-CTR) is incremented by one and the location of the word (in SEN-TBL) is stored in the element of the singular storage matrix (SG-TBL) that is indexed by SG-CTR. The value of the NP weight is also checked and modified as appropriate at this point (i.e., if the word is singular, then if the current value of N-WEIGHT is not negative, then this value is incremented by one, and if the word is plural, then if the current value of N-WEIGHT is not positive, then this value is decremented by one). Once this loop exits, the values of SG-CTR and PL-CTR are checked; if both counters hold non-zero values, then there is a number-agreement inconsistency in the NP. In that case, it is processed further as follows.

First, the magnitudes of SG-CTR and PL-CTR are compared relative to one another; if only one word is marked as being singular and more than one is marked as being plural, then the singular one is flagged and a message suggesting its transformation into the appropriate plural form is generated. On the other hand, if more than one element in the NP is singular, but the number of singular elements is still less than the number of plural ones, then an internal procedure "MULT-ERRORS" is called to generate and link together the two rings of error messages associated with the elements of the NP that are inconsistent with respect to number agreement. Otherwise, if only one word is marked as being plural and more than one is marked as being singular, then the plural one is flagged and a message suggesting its transformation into the appropriate singular form is generated. On the other hand, if more than one element in the NP is plural (but the number of plural elements is still less than the number of singular ones), then "MULT-ERRORS" is called to generate and link together the two rings of error messages associated with the elements of the NP that are inconsistent with respect to number agreement.

If none of the above cases is true, then there are equal numbers of words with singular and plural tags in the NP. By far the most common sequences of this type will involve one plural and one singular tag. In this case "MULT-ERRORS" is also called to generate and link together the two rings of error messages associated with the elements of the NP that are inconsistent with respect to number agreement.

The foregoing error messages are generated by a procedure that copies the original form of the inconsistent work, accesses an error message from a table of such messages, calls a procedure to construct the appropriate singular or plural form of the inconsistent work (e.g., from its stored base form and inflection code), and links together several error messages if the inconsistency does not suggest a unique error. It then displays the original word, error message(s) and suggested correction(s).

Finally, GcsNPEB sets the value of the current NPs number-agreement feature (according to the value of the NPs weight), and then closes the current NP by incrementing the current NP counter variable (NP-COUNT) by one and also setting (to '1'B) the "close-NP" boundary on the SEN-NODE preceding the SEN-NODE associated with the current word. GcsNPEB then returns to its calling procedure.

In this manner the noun phrase processor identifies each noun group, determining its endpoints, feature agreement properties and component words. For each identified noun group a NP data structure receives this information, with the set of such NP data structures forming an ordered NGROUPS structure.

After the above-described simplex NP processing loop exits (having applied its algorithms to each SEN-NODE in turn, scanning from left to right across the sentence), another loop cycles through the contents of the NGROUPS structure, proceeding from the last entry to the first, thus in effect scanning the noun-phrase projection of the sentence from right to left. This loop constructs complex noun phrases, where possible, based on the simplex noun phrases previously identified, and also, where appropriate, on the complex NPs that it is in the process of creating. In an early prototype embodiment this is done by applying two rules: (I) a complex NP may be constructed over an NP followed by a prepositional phrase (i.e., an NP preceded by a preposition), and (II) a complex NP may be constructed over two NPs that are separated only by a coordinating conjunction. In both cases, the second element of the pair of NPs specified by the rule may be a complex NP, thus building up, in the case of complex NPs that contain complex-NP constituents, the appropriate structures by a process of left-adjunction. FIG. 6 shows the details of this operation of the noun groups processor.

On entry to this loop, which uses the data of the NGROUPS structure to access and process successive pairs of noun phrases of the sentence, starting at the rightmost simplex noun phrase, the processor starts by examining the last simplex NP in the sentence and the next-to-last one, then continues by examining the next-to-last simplex NP and the third-from-last one, on down to examining the second simplex NP and the first one. At 130 a determination is made if there are less than "n" elements (words or non-terminal punctuation) between the two NPs and, if so, then processing described below is performed to identify certain complex noun phrases satisfying this criterion. If there are more than "n" elements separating two successive NPs then the processor skips over these elements, resets the value of NP-FLAG to '0'B, and proceeds to process the next NP. For descriptive purposes below, n is taken as two and the construction of complex noun phrases whose noun phrase components are joined by one or two elements is described. First, two bit flags, NP-FLAG and CC-FLAG, are initialized to '0'B, and at the beginning of each iteration of the loop the number of elements between the two simplex NPs currently under examination is determined, and the value of a variable, XTAG, is set equal to the null-valued character string.

The processor at 131 determines if the two NPs in question are separated by only one word, and if this word is a preposition. In this case, these two NPs fulfill the structural description of the complex-NP template $$[_{NPc}NP_x[_{PP} IN\ NP_x\ _{PP}]\ NP_c]$$

(where [$_{NPc}$ and $_{NPc}$]are the open- and close-complex-NP boundary markers), so the following processing steps are taken to create a coded record for the complex NP identifying its constituents, linkages to other NPs and feature information.

This is done at step 132 as follows. The value of the linked structure of noun phrase dominating nodes, denoted N-DOM-LK, which corresponds to the rightmost of the two simplex NPs currently under examination is inspected, and if it is non-zero, then the chain of values corresponding to the complex-NP nodes that dominate this complex NP is followed up through their N-DOM-LK's until the highest complex-NP node in this chain is identified. The leftmost NP to be combined may be identified as the "$I^{th}$" one, indexed by the scratch variable I, and the rightmost NP (or the highest complex-NP node that dominates it is identified as the "$J^{th}$" one, indexed by the scratch variable J, which is used in the foregoing chain-search performed on the N-DOM-LK's. The endpoints of the complex-NP node that is constructed in this step are now defined as the leftmost element of the $I^{th}$ NP and the rightmost element of the $J^{th}$ one, by storing these values in the end-point elements (N-SPNTS) of the slot in NGROUPS that is referenced by the current value of NP-COUNT.

Similarly, the constituents that form the current complex-NP node are those defined by the values of the indices I and J. These numbers are stored in the constituent elements (N-CPNTS) of the slot in NGROUPS that is referenced by the current value of NP-COUNT.

Next the appropriate values of the N-DOM-LK elements are determined; the N-DOM-LK elements associated with both the $I^{th}$ and $J^{th}$ NP receive the number stored in NP-COUNT as their value, and the value of the N-DOM-LK element associated with the complex-NP node currently under construction is initialized to zero (since this node is not yet determined to be dominated by any other NP node).

The N-PREPS element which points to the address of a preceding preposition of the complex-NP node is set equal to the value of the N-PREPS element of the leftmost NP in the complex NP currently under construction.

The N-WEIGHT element of the complex-NP node (which is used by NPEB to check feature agreement) of the complex-NP node is set equal to the value of the N-WEIGHT element of the leftmost NP in the complex NP currently under construction.

If the leftmost NP in the complex NP currently under construction is not neutral with respect to number agreement, and if the NP consists of a single word, then the following special processing is done: (i) the tag of the word in this NP is isolated, and if this tag indicates that the word is being interpreted as a post-determiner, then the following actions are taken: (a) the weight of the complex NP is set equal to $-2$; and (b) if the NP that is subordinate to the NP containing the post-determiner is internally inconsistent with respect to number agreement, then an internal procedure denoted CHANGE-NP is called to process it (as detailed further below); otherwise (c) if the number of the subordinate NP disagrees with the number of the post-determiner (i.e., if the weights of the two NPs do not have the same sign), then an error message is assigned to each element of this NP that is not a noun adjunct and that is also not neutral with respect to number agreement.

Finally, after the above steps have been executed, as appropriate, the value of NP-COUNT is incremented by one.

On the other hand, if at step 131 the two NPs in question are not determined to be separated only by a preposition, then the intervening elements are inspected and processed as follows. First, at 134 the MPP tag of the first word to the right of the rightmost element of the leftmost NP is determined and is stored in a temporary variable denoted XTAG, and: (a) if XTAG contains the coordinating conjunction tag "CC" or (b) if NP-FLAG is set to '1'B and XTAG contains either a comma or a semi-colon, then XTAG is set equal to "****", which is interpreted as a flag to construct a complex-NP record, as detailed below.

If there are two elements (rather than just one) between the two NPs currently under examination, then the MPP tag of the first word to the left of the leftmost element of the rightmost NP is determined and stored in a temporary variable YTAG, and XTAG is determined in the same way as was done above. In this case, if XTAG contains either a comma or a semi-colon and if YTAG contains the coordinating conjunction tag "CC", then XTAG is again set equal to "****".

At step 135 the value of XTAG is checked, and if it is equal to "****", then at processing step 136 the processor constructs a complex-NP node that dominates the two simplex-NP nodes currently under examination. The actual attachment between the two NPs is done between the leftmost simplex NP and the highest complex-NP node (if any) that dominates the rightmost simplex NP.

The complex NP node is constructed in substantially the same way as described for step 132, with the exceptions that no preposition marker is set, and the WEIGHT and feature agreement properties are processed as follows.

Once the $I^{th}$ and $J^{th}$ NP components are identified for the complex NP, the N-WEIGHT element of the complex-NP node is set to be equal to the sum of the N-WEIGHT elements of the $I^{th}$ and $J^{th}$ NPs. Then, if CC-FLAG is set to '0'B, signifying that the complex NP currently under construction is not the result of a disjunction, then: (a) the number agreement flags in the N-FEATS bit string corresponding to the complex NP are set to signify plural agreement; and (b) the values of these flags are copied from the corresponding flags on the N-FEATS string associated with the leftmost NP of the disjunction.

Next, if inspection of the conjunction (if any) occurring between the two NPs currently being conjoined indicates that the result is a disjunction, and if neither NP is plural, then CC-FLAG is set equal to '1'B and the plural-indicating bit of the N-FEATS bit string corresponding to the resulting complex NP is set equal to '0'B.

Upon completion of these steps, at 137, the value of NP-COUNT is incremented by one to reference the next available slot in NGROUPS, and the processing is repeated with the next NP.

Preferably, the foregoing steps used in the prototype embodiment for the construction of complex noun phrases are also applied, with appropriate modifications, to construct complex noun phrases joined by a comma or a semicolon, and ones with a coordinating phrase such as "as well as", or an apposition or similar construction.

This is accomplished in a further embodiment of the complex noun phrase processor by a loop which first determines the number of elements located between consecutive noun phrases and then inspects for different specific types of complex phrases depending on that number. For example, constructions of immediately adjacent NPs such as "we students" are recognized and treated as complex phrases created by apposition. Phrases with one or two intervening elements are processed to detect complex phrases joined by a preposition, comma, semicolon or coordinating conjunction, or a coordinating conjunction plus a comma or semicolon, in a manner similar to that described above. Phrases with three or four intervening elements are examined for a connective "as well as", or for ", as well as" in conjunction with a comma following the right-hand NP. For the simpler coordinating structures (having tag "CC" or ",") a subroutine is preferably used to locate any verbal structure associated with each component NP. This verb information is then used to determine whether the coordinating structure operates between noun phrases or coordinates two larger, clausal structures.

In this manner, a processing loop consolidates the simplex NPs into complex NPs with appropriate pointers and feature properties. After the above loop exits, all of the NP-structure has been determined for the current parse of the sentence, and a predication analysis module PRED is called to determine the sentence's predicational structure.

Determination of Predicates

The module GcsPred, or simply PRED, operates on the annotated sentence to process sequences of verbal tags and those non-verbal tags that can occur within the scope of finite and non-finite predications in English. This operation will be more clearly understood with an illustration of representative processing structures, and a detailed description of the portion of a finite state automaton (FSA) in one suitable predicational analysis processor which processes continuous predications beginning with either a modal or a finite form of the auxiliary verb "(to) have". A method is described for extending this processing in a natural way to a finite state automaton, having a number of states, with the processing performed in each state appropriate to the verbal structures involved. The transitions between states are given by a state table.

This construction is discussed below with reference to FIGS. 7-12A. The legal predications of the type described above are listed in FIG. 8; their corresponding tag strings are given in FIG. 9. Inspection of FIGS. 8 and 9 reveals that no finite verb forms occur in these predications, or any predications, after the first position.

In order to encode the legal predications of FIGS. 8 and 9, for each verbal tag, a "tag group number" or TG number is defined as shown in FIG. 7, discussed further below. The legal predications of FIGS. 8 and 9 are then represented by these TG numbers. Two different representations of their corresponding sequences of TG numbers are provided in FIGS. 10 and 11. These TG numbers are used to concisely designate the conditions on the arcs in the FSA that are used to transfer control between states, and thus serve as an index into a state transition matrix that represents the FSA. The TG number of a tag corresponds to the role assumed by that tag in predicate constructions.

FIG. 7 is a table giving the correspondences between tags and the predicational TG numbers that are assigned to them. As can be seen from the Figure, the TG numbers serve to impose a partition on the set of tags, as follows: (a) verbal tags ("Exclusive Group" ("EG") numbers 2 and 3, defined in FIG. 3 above) are separated from all other tags, the former being assigned TG numbers less than 16 and the latter being assigned TG numbers 16 through 20, according to their usage by the predicational-analysis FSA, as will be discussed below; (b) non-finite verbal tags (EG number 2) are separated from finite verbal tags (EG number 3); and (c) non-finite verbal tags are further subdivided according to whether they are infinitives or participles (the latter group also being separated into past and present participles).

There are five divisions of non-verbal tags that are of importance to the predicational-analysis FSA. First, since an occurrence of the "TO" tag suggests that there is an infinitival construction to be analyzed, it has its own finite state, with TG number 16 to index that state. Second, since unrestricted tags of the adverbial type can generally occur freely within the scope of a simplex predication without causing it to terminate (which is the effect of most other non-verbal tags), these tags have their own finite state, with TG number 17 to index that state. With the exception of the above two classes of tags, the occurrence of a non-verbal tag may cause a simplex predication to terminate unless special circumstances are met.

One such special circumstance is if the main predication of a sentence meets the conditions for subject-auxiliary inversion (e.g., "Did the computer program work?", which is an interrogative form of the declarative sentence "The computer program [did work]/worked", in which "did" and "work" are part of the same simplex predication.) In such a case, virtually any tag (except the sentence-end tag ".") can appear between the initial auxiliary verb and the main (infinitive) verb of the predication, as long as it occurs within the scope of a single NP.

If the interstitial fragment is an embedded relative clause, as in "Did the computer program that we thought would be so difficult to get up and running in such a short time work?", then the presence of additional simplex predications within the discontinuous simplex predication "did . . . work" will require further processing. This processing is preferably accomplished by making the FSA recursive, so that, for specific states, the FSA generates multiple copies of its procedure environment and executes a call to its own entry point without losing the values of its current states.

With this discussion of verbal codes and processing considerations, operation of a predicate-determining FSA will now be described for the verbal constructions of FIGS. 8-11.

In FIG. 8, each line of the Figure corresponds to one or more predications, each one containing the number of verbal elements specified by the italicized number that starts the line. In these sample predications, the verb "see" (Paradigm: "[see, sees, saw, seen, seeing]") is used as a typical verb (whose infinitival form would be denoted by the tag "VBI" in the system of grammatical annotation described above). The delimitation of a word by blanks (e.g., "been" on the third line) signifies that it always fills the given slot in the particular predication; words that are separated by commas in a group delimited by braces are alternates that may each occur in the given slot. Thus, there are 18 possible predications corresponding to the representation on the third line of the figure, obtained by a process of linear permutation where each of the first three optional elements in the first slot are paired with the first element of the third slot before the same process is applied to the second through sixth elements in that slot, from the predication "have been being" to the predication "had been seen".

The first four lines of FIG. 8 correspond to representations of the 39 possible predications that may start with a finite form of the auxiliary verb "(to) have" and the remaining seven lines of the figure correspond to representations of the 26 possible predications that may start with a modal auxiliary (here represented by "would"). As can be seen, these predications range in complexity from a single word (e.g., "have") to a five-word phrase (e.g., "would have been being done"), all of which are analyzed as simplex predications by the grammar processor.

FIG. 9 is equivalent to FIG. 8, with each word in the latter being replaced by its corresponding tag. This emphasizes the regularities in the templates by separating the finite and non-finite usages of "have", tagged "HVP" and "HVI", respectively, and "had" tagged "HVD" and "HVN", respectively.

FIG. 10 is also equivalent to FIGS. 8 and 9, but with each word or tag replaced by its TG number. Finally, FIG. 11 is a slightly more compact table which includes all the predications of FIGS. 8-10. This FIG. 11 is obtained by adopting a convention that the representation of a given predication may be truncated on the right. This reduces the number of separate representations needed, by including, for example, the predication representable as a single modal ("MD") under the representations for the predications that have it as their first element and thus may generate it by a truncation at that point. Also, the italicized number to the left of each line in FIG. 11 now refers to the maximum number of verbal elements possible in a predication defined by the representation on that line (i.e., in a predication with no truncated elements that corresponds to a template that is generated by the given representation.)

FIG. 11 contains the representations (which are still equivalent to the predicational templates given in FIG. 8 but which are more amenable to the generation of an efficient FSA) of the type that are used in the creation of the prototype FSA that forms the core of the predicational-analysis procedure. Using these representations, states are set up corresponding to the possible slots in each predicational template (labelled "A" through "E" in the FIG. 11) with the TG numbers corresponding to the tags that cause control to be transferred into the states corresponding to those slots specified directly below the appropriate letters.

This description of FIGS. 8-11 completes the description of a concise representation of legal predicates.

By way of illustration, there now follows a description of the method of constructing an FSA corresponding to the predications that start with a finite form of the auxiliary verb "(to) have" by inspection of the first three lines of FIG. 11 (which encode the templates for those predications).

The states S and F are defined as the starting and finishing states of the FSA; control starts in S and each time it transfers to F this indicates that a predication starting with a finite form of "(to) have" has been identified. Since "8" is the only TG number occurring under the "A" heading in the first three lines of the Figure, one state (designated $A_1$) is defined for the first slot, and two arcs are set up for the FSA's initial state (S), the first of which is a connector to $A_1$ (with the condition that the TG number of the current word be 8) and the second of which is a loop back to S (with the complementary condition that the TG number of the current word be anything but 8).

Similarly, since two different sets of TG numbers occur under the "B" heading in the first three lines of the figure, two states (designated $B_1$ and $B_2$) are defined for the second slot, and three arcs are set up for the preceding state ($A_1$). The first arc is a connector to $B_1$ (with the condition that the TG number of the current word be either 10 or 15); the second arc is a connector to $B_2$ (with the condition that the TG number of the current word be 4); and the third arc is a connector to F—the final state of the FSA—(with the condition that the TG number of the current word be anything but 4, 10, or 15). Since the first line of the figure ends in the second slot, a single arc is defined out of $B_1$ as a connector to F (with the condition that it be followed regardless of the value of the TG number of the current word).

Proceeding to the third slot leads to the construction of two more states (designated $C_1$ and $C_2$) in a manner analogous to the construction of the states for the second slot; three arcs are then set up for th preceding state ($B_2$) as follows. The first arc is a connector to $C_1$ (with the condition that the TG number of the current word be either 9, 10, 14 or 15); the second arc is a connector to $C_2$ (with the condition that the TG number of the current word be 3); and the third arc is a connector to F—the final state of the FSA—(with the condition that the TG number of the current word be anything but 3, 9, 10, 14 or 15). As was the case for $B_1$, a single unrestricted arc is set up as a connector from $C_1$ to F, since the second line of the figure ends in the third slot.

Finally, one state ($D_1$) is defined for the fourth slot; it has a single unrestricted arc as a connector to F and is accessed by use of a connector (from $C_2$) that requires the TG number of the current word to be 15 (the other arc leading out of $C_2$ is a connector to F with the requirement that the TG number of the current word be anything but 15).

The FSA described above encodes the predications represented by the first three lines of FIG. 11, which correspond to the 39 possible predications that start with a finite form of the auxiliary verb "(to) have"; this FSA may be straightforwardly expanded to include the seven predications (which are characterized by the fact that they start with a modal auxiliary that does not have the infinitive "(to) have" as its second verbal element) represented by the fourth through sixth lines of that Figure, as follows.

First of all, the state $A_2$ is defined and an additional arc out of the FSA's initial state (S) is created (with the condition that the TG number of the current word be 11) as the connector that links this state to S. The "loop back" arc on S is then modified so that its condition is that the TG number of the current word be anything but 8 or 11 (formerly its condition was to loop back for any word whose TG number was not 8).

Next, since there are two different sets of TG numbers occurring under the "B" heading in the second three lines of the figure, two more states (designated $B_3$ and $B_4$) are defined for the second slot, and three arcs are set up out of state $A_2$ as connectors; one to $B_3$ (with the condition that the TG number of the current word be either 5 or 12), one to $B_4$ (with the condition that the TG number of the current word be 1), and one to F, the final state of the FSA (with the condition that the TG number of the current word be anything but 1, 5, or 12). Also, since the fourth line of the figure ends with the second slot, a single arc is defined out of $B_3$ as a connector to F (with the condition that it be followed regardless of the value of the TG of the current word).

Proceeding to the third slot leads to the construction of an additional state (designated $C_3$) in a manner analogous to the construction of the states for the second slot; three arcs are then set up for the preceding state ($B_4$) as follows. The first arc is a connector to $C_3$ (with the condition that the TG number of the current word be 3); the second arc is a connector to state $C_1$, which has already been created to handle the third verbal element in predications whose first two elements are "HVF" (TG number 8) and "BEN" (TG number 4) (with the condition that the TG Number of the current word be 9, 10, 14, or 15 ); and the third arc is a connector to F (with the condition that the TG number of the current word be anything but 3, 9, 10, 14, or 15).

Finally, one state ($D_2$) is defined for the fourth slot; it has a single unrestricted arc as a connector to F and is accessed by use of a connector (from $C_3$) that requires the TG number of the current word to be 4 (the other arc leading out of $C_3$ is a connector to F with the requirement that the TG number of the current word be anything but 4).

The extensions to the FSA as described above now encode the predications represented by the first six lines of FIG. 11 (which correspond to the 39 possible predications that start with a finite form of the auxiliary verb "(to) have", plus seven of the 26 possible predications that start with a modal auxiliary); this extension, as shown above, was accomplished both by the creation of new states ($A_2$, $B_3$, $B_4$, $C_3$, and $D_2$) and the utilization (in some cases involving modification) of existing states (S, F, and $C_1$).

The same techniques of utilizing existing states and adding on new ones where necessary are used to expand the FSA defined above to handle the remaining 19 predications that start with a modal auxiliary (which are encoded in the last three lines of FIG. 11); these predications may be differentiated from the seven predications that are encoded in the preceding three lines of the figure by the fact that their second verbal element is the infinitival form of "(to) have" (the second verbal element of the other predications is "be" in the fifth and sixth lines of the figure and any infinitive other than "(to) be" or "(to) have" in the fourth line). Further inspection of the figure reveals that the TG numbers in the C, D, and E slots of the seventh through ninth lines are the same as the TG numbers in the B, C, and D slots in the first through third lines; this regularity is exploited as follows.

First, the state $B_5$ is defined and an additional arc out of $A_2$ is created (with the condition that the TG number of the current word be 7) as the connector that links this state to $A_2$ The arc connecting $A_2$ to F is now modified so that the condition for transferring control to the final state is that the TG number of the current word be any number other than 1, 5, 7, or 12. Arcs out of $B_5$ are now created paralleling those out of $A_1$; the first arc is a connector to $B_1$ (with the condition that the TG number of the current word be either 10 or 15); the second arc is a connector to $B_2$ (with the condition that the TG number of the current word be 4); and the third arc is a connector to F (with the condition that the TG number of the current word be anything but 4, 10, or 15).

This completes the construction of an FSA that accepts those and only those predications described in FIG. 8.

The foregoing example illustrates the construction of an FSA which processes predications starting with either a modal auxiliary or a finite form of "(to) have". Computer implementation of such an FSA is readily accomplished.

For one prototype embodiment of the PRED analyzer, this predication processing is extended as follows.

First, the presence of adverbial words or phrases between the verbal elements of a predication, signaled by TG number 17, is handled by adding a "loop", i.e., an arc that returns directly to its state of origin, to each state other than the start or finish state, with the condition that the TG number of the current word be 17, and by modifying each "negative" arc (i.e., an arc whose condition of execution is specified for all TG numbers other than those in a given list) out of those states so that TG number 17 is added to the list of TG numbers which prevents the usage of these arcs. This handles the case where strings composed of an arbitrary number of adverbs occur between the verbal elements of a given predication (e.g., "had often been", "had really often been", "had really rather often been", etc.), however, it does not take care of adverbial phrases; e.g., "had in that case been", "had interestingly enough been", etc. This latter type of construction, which may involve prepositional phrases being used adverbially, may be addressed by the use of a "semi-final" state F' that is entered (instead of the final state F described above) for the states $A_1$, $A_2$, $B_2$, $B_4$, $B_5$, $C_2$, and $C_3$.

State F' differs from state F in that it has a "memory" where it stores the identity of the state which transferred control to it, and—in the case where it receives input that would allow a legal continuation of the predication in that state—also has the ability to transfer control back to that state. This "semi-final" state, in addition to the ability to transfer control back to the previous state, where appropriate, includes a loop-back arc that allows it to retain control for as long as there is a possibility that the currently suspended, but not closed, predication might resume, and also includes an arc to F, to which control is transferred when an examination of the current input indicates that there is no longer any possibility of the predication's resumption.

Second, in order to process predicates having subject-auxiliary inversion (SAI) and further simplex predicates within a discontinuous SAI structure, a number of new states are preferably added which basically recognize the sentence as fitting an SAI template and which verify that it is transformable into a well defined non-SAI normal form.

Third, the FSA is preferably extended to process complex predications by restricting the FSA to the structure of simplex predications and allowing its predication-final states to select between processing the next predication either as (a) being within the same simplex sentence as the previous (simplex) predication; or (b) being within the scope of the next simplex sentence—depending on the intervening context, which is inspected independently of the predicational-analysis portion of the FSA.

For purposes of the subsequent clausal analysis and feature concordance processing, the predication processor effects certain actions associated with the state transitions to annotate the sentence processing structure with the information (e.g. an open-VG marker, a close-VG marker, a substitution of a tag) which is ascertained by virtue of the PRED processor having reached the particular state transition. Further, since this processing section of the grammatical analyzer must re-enter its earlier states after substituting a second- or third-choice tag, it must create a state description sufficient to re-enter the required earlier states.

FIG. 12 shows the FSA state description structure FSA-DESC which is used in the aforesaid prototype embodiment to maintain processing state information during processing of such alternative stages. The descriptive structure FSA-DESC is a based structure, with each copy of the structure containing information necessary to describe one level of recursion of the predicational-analysis FSA. These structures are stored in a LIFO linked list, thus corresponding to the "center-embedded" nature of their corresponding syntactic structures. At any given point in the execution of PRED, the copy of FSA-DESC that is being pointed at by the basing pointer FD-PTR contains the information defining the FSA configuration corresponding to the predicational analysis of the clause that is under examination at that point. The current clause is defined as the segment of the sentence bounded on the right by the word currently under examination and bounded on the left by the word (or punctuation mark) immediately to the right of the suspension-point of the last predication, if such a point exists; otherwise, the left boundary is the first word of the sentence. The predicational analysis of the entire sentence at any given point is represented by the linked list of all FSA-DESC structures, which, because of the LIFO nature of the list's construction, is ordered according to the depth of recursion necessary to reach each of the predications it encodes.

As shown in FIG. 12, FSA-DESC in the prototype embodiment consists of fifteen elements, as follows.

The first element of FSA-DESC is a pointer, LINK-PTR, which is used as the linked-list chaining pointer that points at the FSA-DESC structure encoding the FSA configuration of the level of recursion immediately above the level currently under examination. If LINK-PTR is null, then the FSA-DESC structure it is associated with encodes a predication that is not embedded in any other predication.

The second element of FSA-DESC is OST-NBR, a number identifying the previous state of the predicational-analysis FSA. When the first copy of FSA-DESC is allocated for a given sentence, OST-NBR is initialized to one, the number of the state in which the predicational-analysis FSA begins its analysis of the sentence; if any additional copies of this structure are allocated, then the value of OST-NBR associated with each copy is initialized to the number of the state that allocated it and is then subject to change as the analysis of the predication encoded by the given copy of FSA-DESC proceeds through the appropriate states of the FSA.

The third element of FSA-DESC is NST-NBR, a number that identifies the "new" or current state of the FSA. When a copy of FSA-DESC is allocated (either by GcsPred on entry, or by a state within the predicational-analysis FSA that is allowed to initiate recursion), NST-NBR does not necessarily receive an initial value; this is because its value may be input dependent, and different states will in general be used to process modals, past and present participial forms, etc. The value of NST-NBR is thus preferably assigned after determination of a word's tag. After a state transition has been made and the actions associated with entry into the new state have been executed, the value of NST-NBR is copied into OST-NBR, so that the "current" state will automatically become the "previous" state for the next iteration of the loop that operates the FSA.

In one prototype, when the action associated with entry into the new state involves transfer into a third state, so that two state transitions are associated with a single item of input, the identity of one extra state is stored in a static variable XST-NBR outside the FSA-DESC structure.

The fourth element of FSA-DESC is TAG-NBR, a number that contains the TG number of the MPP tag of the word currently under examination by the predicational-analysis FSA. This TG number determines the state transition for that word; e.g., OST-NBR and TAG-NBR provide the coordinates in the state-transition matrix of the predicational-analysis FSA that define the value for NST-NBR.

The fifth element of FSA-DESC is CUR-PARSE, a number identifying the location (in the current word's set of possible tags) of its MPP tag, which is used in the "current parse" of the sentence. This information is used (in addition to the identity of the MPP tag, which is stored in the static variable CUR-TAG) for states in the predicational-analysis FSA which have the power to change the identity of a word's MPP tag.

The sixth element of FSA-DESC is MIGHT-START-VG, a number that contains the location, as an index into SEN-TBL, of the first element of a string of one or more adverbs (if such a string exists) directly preceding the first verbal element (including the infinitival "to" if present) of a given predication. This variable allows the efficient recognition of these strings, and their attachment as the leftmost constituent of the predication that follows them, without requiring additional states for this purpose or increasing the complexity of the predicational-analyzer. The value of MIGHT-START-VG is initialized to zero whenever a copy of FSA-DESC is allocated; it is set by the process that also assigns TG numbers, as follows: (a) if a given MPP tag is assigned the TG number 17 (meaning that it is functioning adverbially) then if MIGHT-START-VG is equal to zero this value is replaced by the number representing the index in SEN-TBL of the current word (if MIGHT-START-VG is non-zero at this point, then the adverb is one of a string of adverbs whose leftmost element has already been identified); (b) if a given MPP tag is assigned a TG number that is less than 17 (meaning that it is functioning verbally), then the value of MIGHT-START-VG is not altered; and (c) otherwise (if a given MPP tag is assigned a TG number that is greater than 17) the value of MIGHT-START-VG is reset to zero, since if it was non-zero at that point then the string of adverbs that it was indexing could not be contiguous with the leftmost element of a predication.

The seventh element of FSA-DESC is CUR-NP-COUNT, a half-word precision fixed-point number that contains the location in NGROUPS of either: (a) the last simplex NP to be processed by the predicational-analyzer (if the word currently under examination does not occur within the scope of a simplex NP); or (b) the simplex NP in which the word currently being processed occurs. The differentiation between these two cases is accomplished by an inspection of the value of NP-FLAG (the twelfth element of FSA-DESC); it is set to '1'B ("true") whenever the word currently being processed is determined by inspection to be within the scope of a simplex NP.

The use of CUR-NP-COUNT proceeds as follows. Since (unlike the usage of NP-COUNT in GcsPrsr) CUR-NP-COUNT is used to index the NP currently being processed (or, if no NP is currently being processed, the last one to have been processed, if any), it is initialized to zero and then is incremented by one each time a word is processed that has an "open-NP" boundary associated with it. After it is incremented, the slot that it now indexes in NGROUPS is inspected to determine whether or not it is active; if not, then CUR-NP-COUNT is incremented again, a process which continues until the simplex NP associated with the current word is located. Once CUR-NP-COUNT has been set to index the simplex NP associated with a word that is preceded by an "open-NP" boundary (as encoded in the SEN-NODE structure corresponding to the word in question), it is not modified until the next word of that type is encountered, since an inspection of the value of NP-FLAG will indicate whether or not subsequent words are within the scope of this NP.

The eighth element of FSA-DESC is CUR-VG-COUNT, which is a number identifying the location in VGROUPS of either: (a) the slot that corresponds to the simplex predication currently under construction; or (b) if no predication is currently being examined by the predicational-analysis FSA, the next slot in VGROUPS that is available for that purpose. This is similar to the usage of the static variable NP-COUNT during the simplex-NP scan in GcsPrsr, with one important exception. Since, unlike simplex NPs, simplex predications may be embedded in other simplex predications, if there is more than one level of recursion currently active in the predicational-analysis FSA, there also must be more than one active slot in VGROUPS. Since these slots are indexed by the values of the CUR-VG-COUNT variables associated with the copies of the FSA-DESC structures that correspond to each level of recursion, they are well defined within the scope of their corresponding (center-embedded) clauses. One complexity which does not exist in the analysis of simplex NPs discussed above, arises only after the recursive processing of an embedded predication finishes and control returns to the analysis of the predication that contains it. At that point the identity of the currently active slot in VGROUPS is stored in the CUR-VG-COUNT variable associated with the FSA-DESC structure pointed at by the basing pointer FD-PTR. The next available slot in VGROUPS is identified by using a static variable VG-COUNT (which is defined, like NP-COUNT, in an external sentence data structure SEN-STR) to keep track of the next available slot in VGROUPS, regardless of the current level of recursion, by initializing it to one and then: (a) incrementing it by one each time a predication is finished or a new level of recursion is initiated; and (b) decrementing it by one each time a level of recursion returns control to the level that initiated it. Reference is then made to the VG-COUNT to determine the appropriate slot of VGROUPS.

The ninth element of FSA-DESC is CUR-SEN-COUNT, which is a number identifying the location in the SEN-ARRAY sub-structure (of the externally defined SEN-STR static structure) of the slot that corresponds to the sentence currently under construction. As was the case for CUR-VG-COUNT, CUR-SEN-COUNT is an accurate index within each level of recursion, but a static variable SEN-COUNT is used to keep track of the identity of the next available slot in SEN-ARRAY). Like VG-COUNT, SEN-COUNT is initialized to one, and then: (a) is incremented by one each time a sentence is furnished or a new level of recursion is initiated; and (b) is decremented by one each time a level of recursion returns control to the level that initiated it.

The tenth element of FSA-DESC is CUR-LEVEL, which is a number that contains the level of recursion of the currently active copy of FSA-DESC (i.e., the copy that is pointed at by the basing pointer FD-PTR). A value of zero indicates that there is no active recursion, i.e., that the FSA-DESC structure pointed at by FD-PTR is the only one in the linked list. A value of one indicates that there is one active level of recursion. i.e., that the linked list contains two FSA-DESC structures, etc.

The eleventh element of FSA-DESC is FINITE-PRED, which is a one bit flag indicating whether or not the word currently under examination by PRED either: (a) lies within the scope of a finite predication (if a predication is currently being analyzed); or (b) lies to the right of a finite predication, with no intervening non-finite predications (if no predication is currently being analyzed). Whenever construction is started on a predication, the appropriate value of FINITE-PRED is set to '1'B ("true") if the predication is finite and to '0'B ("false") if it is not, and this value is not altered, so that even after the predication currently under examination is completed, the fact that is was either finite or non-finite is preserved until the start of the next predication (if any). This information may also signal the occurrence of "left-truncated" predications, for further processing.

The twelfth element of FSA-DESC is NP-FLAG, which is a one bit flag indicating whether or not the word currently under examination by the predicational-analysis FSA lies within the scope of a simplex NP. Since the extent of each simplex NP has been previously determined by GcsPrsr, the setting of NP-FLAG is accomplished in GcsPred by the inspection of the "open-NP" and "close-NP" boundary flags associated with the SEN-NODE structure corresponding to the word currently under examination.

The thirteenth element of the FSA descriptive structure is VG-FLAG, which is a one bit flag indicating whether or not the word preceding the word currently under consideration is part of an unfinished predication. The definition and usage of VG-FLAG differs from that of NP-FLAG in that the latter indicates an attribute of existing syntactic structure (since the simplex-NP boundaries have already been set by GcsPrsr), while the former indicates the possibility of certain structures (depending on how the PRED processing of the current word proceeds) being constructed in the given location.

The setting of VG-FLAG is accomplished by the subprocedures that start and end predications (the former setting it to '1'B and the latter to '0'B) When the procedure that starts predications beginning with the current word is called to set up a new predication, this procedure checks the value of VG-FLAG in order to see whether or not this new predication will "truncate" an existing one. If VG-FLAG is set to '1'B at that point, then a predication-ending procedure is first called so that the previous predication is properly truncated (i.e., it will end with the previous word, and thus not include the current word, which will start a new predication).

The fourteenth element of FSA-DESC is V-FEAT, which is a bit string that contains either: (a) the inflectional feature string of the verbal form currently being processed; or (b) if the MPP tag of the word currently being processed does not possess verbal features, the inflectional feature string of the verbal form most recently processed within the current level of recursion, if any, by the predicational-analysis FSA. These feature codes indicate that a given verb form requires number agreement or person agreement with a subject, if finite, identify certain irregular paradigms, and indicate whether the verb is a modal or requires special lexical handling.

The fifteenth element of FSA-DESC is FILLER, an array of one-bit strings. This variable is used to full-word align FSA-DESC, and its elements are also available if necessary as transient flags that, because they each are associated with a particular copy of FSA-DESC, may be used to control processes limited to a given level of recursion.

This concludes the element-by-element description of a processing state description structure FSA-DESC containing the ensemble of state information which is derived and maintained during the analysis of verb groups by PRED. As noted above, the purpose of FSA-DESC is to control the operation of the predicational-analyzer so that it may be used recursively, by allocating a new copy of FSA-DESC for each level of recursion. The variables associated with FSA-DESC encode all of the information needed to describe any configuration of the predicational-analysis FSA, so that the "stacking" of an existing configuration may be done simply by saving the FSA-DESC that encodes it, using one or more other FSA-DESC structures to process each level of recursion that underlies it, and then restoring the configuration at the appropriate point by returning to its FSA-DESC structure after all other lower levels of predicational analysis have been completed.

Returning now to the description of the predication analyzer, it will be understood that in general the operation of the FSA progresses from an initial state, through one or more intermediate states to a final state. During each intermediate state one or more processing steps may be performed as appropriate for that state, and the existing global data structures are modified in the event such processing steps determine new data or resolve a processing ambiguity in a manner which rules out a previously determined annotation, such as a tag assignment. For example, where no proper parse has been achieved, a state may require relabeling of a present tense verb as a common noun, requiring the re-running of the noun phrase processor. After performing its processing steps, if any, each non-final state will transfer processing control to another state when the conditions for such transfer occur.

This operation will be understood with reference to FIG. 12A, which shows in table form representative state transitions for a second prototpye embodiment predication analyzer, based on the first, above described analyzer.

As shown in FIG. 12A, each processing state is listed on a successive line of the Figure. The possible tags, substantially as illustrated in FIG. 7, appear in order along the top line, and, for each state, the next state for a given tag appears in the column below the given tag. Thus, for example, for state 7 the BEF tag causes a transition to state 13, the DOI tag causes a transition to state 2, and so forth.

In this second prototype embodiment, a single "supertag" is used to designate certain classes of the tags appearing in FIGS. 7-12. Thus, DOF designates the tags for finite forms of the verb "to do", BEF finite forms of the verb "to be" and VBF finite forms of all other verbs (these latter verb forms are represented by the tags with TG number 13 in the embodiment of FIG. 7). It will also be observed that in the set of possible tags shown in FIG. 12A, the unrestricted adverbial tag RB (TG number 17) is followed by a single tag CNP rather than both the "open-NP" and the "close-NP" tags (TG numbers 18 and 19) shown in FIG. 7. In this embodiment CNP denotes "close-NP"; the processor is set up so that when it encounters an "open-NP" boundary tag it jumps to the next "close-NP" boundary, and resumes processing. This reflects the practical absence of verbal structures within noun phrases.

The operation of this second predicational analyzer will now be illustrated by its operation on representative sample sentences. The processor starts in initial state 1, and if it encounters a sentence initial noun phrase (i.e., the CNP tag), it goes to state 7. This state performs processing to match up a noun phrase as the subject of the next finite verb. As shown in FIG. 12A, if the following word is a finite verb (tagged VBF) the processor, having found its verb, proceeds to the final, or predication-completion, state, which is state 32 in the state table.

Thus, for example, the sentence

|  | He | walks | . |  | is tagged |
|---|---|---|---|---|---|
|  | CNP | VBF | XX |  | with state transitions |
|  | 1→7 | 32 | 32 |  |  |
| and analogously: |  |  |  |  |  |
|  | He | does | walk | . | is processed thus: |
| tag | CNP | DOF | VBI | XX |  |
| state | 1→7 | 14 | 32 | 32 |  | where state 14 is a processing state for identifying predicates starting with a finite form of "to do" following a noun phrase.

Similarly, following a sentence-initial noun leading to state 7, constructions such as "has been walking" (HVF/BEN/VBG) proceed through state 15 (for finite forms of "to have") to state 21 (for second or third level verbal constructions of the form SHVF+SBEN, or SMD+SHVS+SBEN, or STO+SHVI+SBEN) to state 32. The construction "should have been walking" (MD/HVI/BEN/VBG) will proceed through states 12, (a modal auxiliary state) to state 20 (which recognizes SMD or STO +SHVI) to state 21 to 32. Thus, the FSA predication processor operates much as described in the basic FSA construction for recognition of the legal predicates illustrated in FIGS. 8-11.

By way of further example, again referring to the state transitions of FIG. 12A, after recognition of a sentence initial noun followed by a finite verb, the occurrence of another noun while in state 32, as in "He gave the girl a book." or
"He thinks the girl went."

will cause the processor to enter state 35. This state is a post-predicate NP processing exit state, which performs a processing routine to determine whether the noun "the girl" is an object of the verb, or is a possible subject of a later verb with a subordinating "that" omitted. This latter determination is preferably performed by looking up the verb ("gave" or "thinks") in a fixed table of verbs for which the subordinating "that" is commonly deleted or elided. This processing recognizes that "the girl" in the second example is a possible subject, so that the immediately following occurrence of "went" is recognized as having "the girl" as subject.

The sentence
"I think the book the author wrote was on the table."
is handled similarly, except that following the occurrence of "the book" and entry into state 35, after the verb "think" is identified in the table as a "deleted 'that'" verb, the occurrence of a second NP "the author" (rather than a finite verb) causes the processor to enter recursion, saving the state 35 state description and processing the second noun phrase also in state 35, as the subject of the verb "wrote", before ending recursion. It then returns to state 35 with the stored state parameters, and recognizes "the book" as the subject of "was".

This concludes the description of operation of the predication analyzer according to the invention. After this analyzer has run, various constructions will have been recognized, and in the process certain incorrectly-tagged words will have been re-tagged, with the text sentences now fully annotated in terms of the occurrence of noun phrases and elementary predications, or clauses.

Global Data Annotations

As the predicational analyzer determines verb groups and the related noun phrases, it updates the processing data in FSA-DESCR, in the external SEN-STR, in NGROUPS (the noun phrase information structure), and in VGROUPS (an analogous verbal structure containing information concerning simplex and complex verb groups). Necessary elements of VGROUPS accessed by the predicational analyzer, and their descriptions, are: V-SPNTS (which contains the starting and ending points for each simplex verb group in VGROUPS); V-CPNTS (which contains the starting and ending points for each complex verb group in VGROUPS); V-DOM-LK (which contains the identity of the complex-VG node (if any) that dominates a given VG); V-WEIGHT (which contains the weight of the complex-VG node (if any) that dominates a given VG); V-FEATS (which contains the identity of the verbal features associated with the finite verb (if any) in a given simplex VG); and V-MARKS (which contains the identity of the finite verb (if any) in a given simplex VG).

Figure 13:
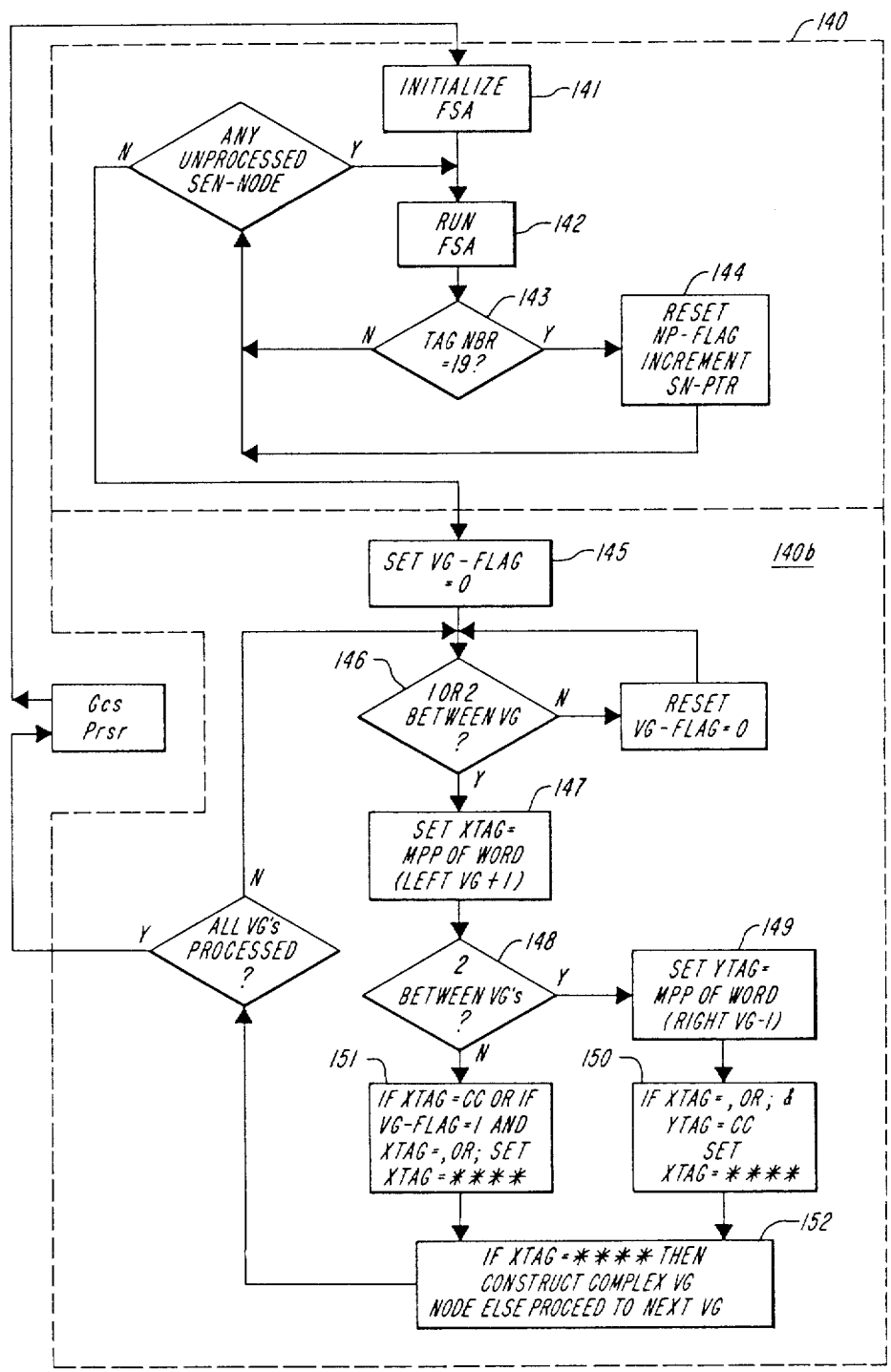
FIG. 13 is a flow chart of the simplex and complex predication processor.

FIG. 13 illustrates the overall operation of the PRED processor 140. In a first stage at 141 the processing variables are initialized, and at 142 the predicate recognizing processor as described above is run to analyze successive sentence nodes. At 143 the TG number is inspected, and the NP flag is reset at 144 if the current word is the last word of an NP.

The predicational analyzer, after processing all of the SEN-NODE structures to identify simplex verb groups, executes a complex-verb group scan and construction. This phase is similar to, but simpler than, the complex-NP scan of GcsPrsr discussed above with reference to FIG. 6. Like the complex-NP scan, it operates as a loop that proceeds from right to left through the sentence, in this case operating on the simplex-VG projection of the sentence, searching for simplex (VG) constituents to combine into complex constituents when they fit the proper templates. In the prototype grammar processor, templates for complex VGs are:

$$[_{VG_c} VG_s \{,|;\} VG_c VG_c] \text{ and } [_{VG_c} VG_s (\{,|;\})cc VG_x VG_c]$$

where $VG_x$ may be either a simplex or a complex VG.

FIG. 13 illustrates this verb group processing, which starts by examining the last simplex VG in the sentence and the next-to-last one, then continues by examining the next-to-last simplex VG and the third-from-last one, on down to examining the second simplex VG and the first one.

On entry, at step 145 the bit flag VG-FLAG is initialized to '0'B, and at step 146 beginning each iteration of the loop, the number of elements between the two simplex VGs currently under examination is determined. If there are either one or two elements between these two VGs, then the following processing is done (otherwise they are discarded and the value of VG-FLAG is set equal to '0'B, for reasons that are detailed below). First of all, at step 147 the MPP tag of the first word to the right of the rightmost element of the leftmost VG is determined and is stored in a temporary variable XTAG. Next, at 148 it is determined if there are two (rather than just one) elements between the two VGs currently under examination, and, if so, at step 149 the MPP tag of the first word to the left of the leftmost element of the rightmost VG is determined and is stored in a temporary variable YTAG. At step 150 a determination is made if XTAG contains either a comma or a semi-colon and if YTAG contains the coordinating conjunction tag "CC". In that case, XTAG is set equal to "**" which operates as a flag to execute the complex-VG construction statements detailed below. Otherwise, if there is only one element between the two VGs currently under construction, then at step 151((a) if XTAG contains the "CC" tag, or (b) if VG-FLAG is set equal to '1'B and XTAG contains either a comma or a semi-colon, then XTAG is again set equal to "**".

At step 152 the value of XTAG is checked, and if it is equal to "****", then the processor constructs a complex VG node with the correct information for the extents and features of a complex-VG node that dominates the two simplex-VG nodes currently under examination. For proper structure, the actual attachment between the two VGs is done between the leftmost simplex VG and the highest complex-VG node (if any) dominating the rightmost simplex VG. The construction proceeds as follows: (a) VG-FLAG is set equal to '1'B; (b) the value of V-DOM-LK corresponding to the rightmost of the two simplex VGs currently under examination is inspected, and if it is non-zero, then the chain of values corresponding to the complex-VG nodes that dominate this simplex VG is followed up through the appropriate V-DOM-LK's until the highest complex-VG node in this chain is identified; (c) at this point the leftmost VG to be conjoined is the "$I^{th}$" one, indexed by the scratch variable I, and the rightmost VG (or the highest complex-VG node that dominates it) is the "$J^{th}$" one, indexed by the scratch variable J (which is used in the chain-search performed on the V-DOM-LK's in the preceding step); (d) the endpoints of the complex-VG node that is being constructed are now defined as the leftmost element of the $I_{th}$ VG and the rightmost element of the $J^{th}$ one, so these values are stored in the endpoint elements (V-SPNTS) of the slot in VGROUPS that is referenced by the current value of VG-COUNT; (e) similarly, the constituents that form the current complex-VG node are those defined by the values of the indices I and J, so these numbers are stored in the constituent elements (V-CPNTS) of the slot in VGROUPS that is referenced by the current value of VG-COUNT: (f) the appropriate values of the V-DOM-LK elements are now determined; the V-DOM-LK elements associated with the the $I^{th}$ and the $J^{th}$ VG receive the number stored in VG-COUNT as their value, and the value of the V-DOM-LK element associated with the complex-VG node currently under construction is initialized to zero (since this node is not yet determined to be dominated by any other VG node); (g) the V-WEIGHT element of the complex-VG node is now set to be equal to the sum of the V-WEIGHT elements of the $I^{th}$ and the J $P^{th}$ VGs; (h) the number-agreement features of the $I^{th}$ and the $J^{th}$ VGs are now checked, and if they do not agree, then error messages are generated for these words; (i) otherwise, if there is no disagreement in number between the VGs being conjoined, then the appropriate number-agreement feature is determined for the complex-VG node and is assigned to it; and (j) the value of VG-COUNT is incremented by one, so that it references the next available slot in VGROUPS.

The processing stage 140b proceeds to inspect each successive VG in its right-to-left scan, and when all VGs have been processed, the loop exits, returning to its calling procedure.

After PRED returns, the sentence's predicational structure, in the form of simplex and possibly complex verb groups, has been determined, along with tentative subject assignments for each finite verb group, the latter being indicated by numeric pointers (stored in an array SEN-ARRAY SUBJ) to the rightmost NP in each (possibly complex) subject NP.

After identification of noun phrases and verb groups, a clausal analyzer operates on the noun and verb group data to determine the clausal structure of the sentence. When errors, i.e., clausal patterns inconsistent with a correct parse, are determined, an error message is generated.

Figure 14:
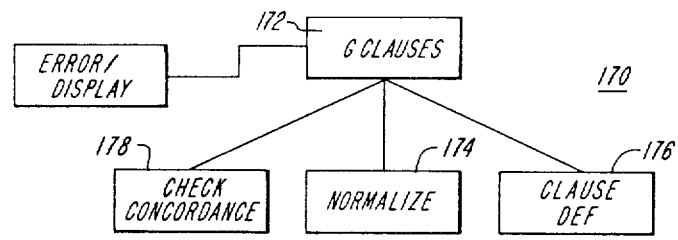
FIGS. 14-15 are flow charts of clausal analysis using the previously determined syntactic structures.

FIG. 14 shows the overall operation of the clausal analyzer 170. A flow of control module 172 controls this higher level analysis in three roughly consecutive phases. First a normalizing module 174 redirects certain noun and verb group pointers to order them in a manner more appropriate for clausal analysis. Second, a clause type defining module 176 processes the normalized data to label each clause as being one of four types. Thirdly, when the clausal relationships of the components of the analyzed sentence have been defined, a concordance processor 178 verifies that the identified structures satisfy appropriate agreement rules.

The normalization proceeds as follows. The processor inspects the first clause-like verb group and, if it contains no finite predication, and if further there is no subject or if it has the form of a parenthetical clause, a No Clause Flag is set to TRUE. If there is a noun group subject that is part of a complex noun phrase, its endpoint starting pointer is set to the start of the dominating noun phrase; otherwise its endpoint starting pointer is set to the starting position of the noun phrase itself. If this starting point is zero, i.e., it is a sentence-initial noun phrase, the No Clause Flag is set to TRUE. This pair of conditions, indicating a Predicateless sentence initial "subject", is recognized as not a proper clause and the existing clausal structure based on it is removed from memory, the next clause is loaded, and the variables reset. This processing is repeated to determine any other non-clauses in the sentence. During this processing, each correct subject which is a noun group is normalized by setting its starting pointer and endpoints to be those of the dominating node, if it exists, for the noun group. For a fragment, i.e., a phrase acting as a subject, the endpoints are set to be those of the fragment.

On the other hand, if there is a predicate, the predicate is normalized by setting its endpoints to be those of the highest dominating complex predicate node in the V GROUPS structure and the clausal endpoints are then assigned as follows. The start and end of the correct clause are provisionally set equal to the start and end of the subject. If there is a finite predicate, then if it starts or ends before (respectively after) the start of the clause, the clausal endpoints are reset at the outer most start (respectively end) of the predicate. At this point the clause type is provisionally set as UNDEFINED. This classification serves as the default classification for clause types. In subsequent processing, if later recognition protocols do not insert a different type, the UNDEFINED clauses will be the matrix clauses of sentences.

Once the preliminary clausal boundaries have been set and non-clausal (e.g., predicateless) material removed, the tentatively identified clauses are processed to define exact clausal boundaries and types.

Figure 15:
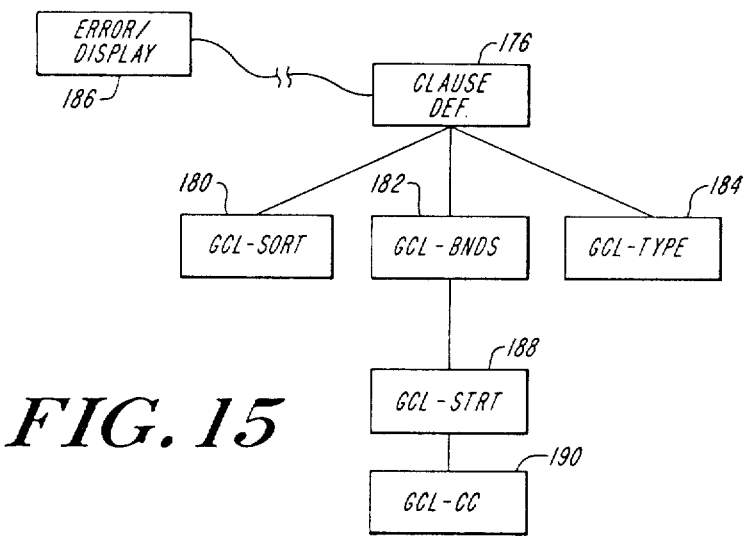

FIG. 15 shows the operation of the clause defining processor 176 of FIG. 14. Processor 176 manages the flow of control of four basic processes, which in a prototype embodiment are broken down into modules denoted Gcl-Sort 180, Gcl-Bnds 182, Gcl-Type 184 and Gcl-Errs 186. Module Gcl-Sort orders the subject-predicate "clauses", which have been provisionally identified during normalization, by sorting them according to sentence position based on the leftmost word of their core group.

Once the clauses have been sorted, the boundaries module Gcl-Bnds 182 determines clausal boundaries with a greater degree of precision. The general processing operates on successive clauses from left to right; to implement this processing Gcl-Bnds sets the left boundary of a clause and the right boundary of the next clause to the left; it also identifies nested clauses and sets their right boundaries. This processing proceeds as follows. First, if the current clause has no predicate, an error condition is noted. Next, if there is no clause to the left and no outer clause starting on the left, then there is no clausal material to the left of the current clause and its starting point is set equal to zero, the beginning of the sentence. Otherwise, if there is an outer clause starting to the left of the current clause, then the current clause is nested. In this case, the boundaries module sets a variable, "lastleft", which points to the leftmost node to which the current clause can be extended. Lastleft is set to be the word after the right endpoint of the subject of the outer clause.

On the other hand, if there is an adjacent clause to the left, lastleft is set equal to the first word following the core of the leftward clause. The left boundary of the current clause is then set by a module Gcl-Strt 188, which is called to analyze intervening sentence nodes and to move the left endpoint of the clause toward lastleft.

If the current clause has an outer clause abutting it to the right (ascertained by inspection of an IS-NESTED Flag in the clausal data array set by the sorting routine), a search is made for a verb indicating re-entry into the outer clause, and if the verb is found, a further check is made for words which probably should be right attached to the outer clause verb. If such words or pairs of words are found, then the right boundary of the current clause is set immediately before the found word or words. Otherwise, the current clause endpoint is set just before the verb.

During the foregoing processing the provisional clausal boundary, lastleft, is used as a processing marker for a processing module Gcl-Strt 188 which examines material to the left of a clause core up to and including the sentence node identified by lastleft in order to identify leftward sentence nodes that should be included within the clause and also to identify the clause type if possible. If the appropriate nodes are found, and the clause type determined, the resulting values are stored in the clause type and endpoint fields of a global clause data structure. If not, Gcl-Strt returns without taking further action. The operation of this module is set forth in an attached computer printout, Appendix A0, written in the C programming language.

Gcl-Strt also calls a further module Gcl-CC 190 which identifies leftward coordinating conjunctions, or coordinating conjunctions preceeded by a comma.

The operation of Gcl-Strt is as follows. It first initializes the clause pointer and boundary variables and determines if there is any leftward material to examine. If there is none, control returns to the boundary module 182. Otherwise a leftward scan is initiated to identify a that/wh word introducing a subordinate or W clause; or a semi-colon, colon, coordinate conjunction or special adverb introducing a coordinate clause. If a semi-colon or colon is found, it is included in the clause and the clause type is set to COORDINATE clause. Otherwise, if a comma is found, the processor 188 determines if it is an unpaired comma. If so, it is taken as a clausal boundary; if the comma is one of a pair, processing skips the material between the commas and advances to the index of the first comma.

If processor 188 locates a coordinating conjunction, then a check is made whether the conjunction is the word "either" or "neither" and if so whether it is coordinating a complex subject rather than two clauses. If such a complex subject is found, a by-passing flag denoted "Skip It" is set equal to TRUE and the processor continues; otherwise the coordinating conjunction is coordinating clauses and the clause type is set to COORDINATE clause. If the coordinate clause is preceded by a comma, the comma is also included in the current clause.

If the Gcl-Strt module 188 encounters a subordinating conjunction, then the processor searches for a pattern of punctuation and noun phrase with "as/that/though" introducing a subordinate clause (for example " . . . , expert in economics that he is . . . ".) For such a pattern, the start of the clause is set at the beginning of the noun phrase; otherwise the boundary is set at the subordinating conjunction, or, if there is a coordinating conjunction to its left, at the coordinating conjunction. Continuing with the search for a clausal starting point, wh adverbs, determiners, subjective and objective personal pronouns are identified as the start of W-clauses, and the adverbs "then/otherwise/hence" are recognized as introducing COORDINATE clauses. If a prepositional phrase or a dominating noun phrase is encountered, the module 188 jumps to the beginning of such a phrase, and continues scanning until it reaches the index lastleft. If a boundary and type have been determined, it exits without further processing; otherwise a number of special processing conditions are also preferably examined to detect various special constructions which may introduce subordinate clauses. In the presently preferred embodiment the detection of such a construction is indicated by setting a flag which in later clausal processing is inspected to confirm such subordinating construction when other analytic factors lend weight to this interpretation.

Continuing with the description of FIG. 15, when the Gcl-Bnds module 182 returns, clausal boundaries will have been set and coordinate, subordinate and W-clauses will have been provisionally identified as part of the boundary-determining procedure which inspects the starting word of a clause. At this point the clause type verifier 184 is called to inspect the clausal structures which have been defined. Gcl-Type further assigns a type to all undefined clauses. Appendix A1, attached hereto, sets forth the prototype embodiment of this processing module in the C programming language. This processor loops through all the sorted clauses, first getting a pointer to the current clause structure and the index and tag of a predicate finite verb. It then determines the clause type by eliminating "clauses" lacking predicates, and inspecting the remaining clauses, including those which have been typed as UNDEFINED. Such clauses may be MATRIX clauses, SUBORDINATE clauses with subjunctive inversion, some type of Wh-clause or a relative or reduced-relative or similar clause. These latter are typed as W-clauses in the prototype.

If the clause is nested and has a subject, it is identified as a W-clause, otherwise a nested clause without a subject is considered malformed and a "bad clause" designation is set. If the clause is not nested the location of first word of the clause and the location of the first word of the clause's subject are compared. If there is no subject the value −1 is taken as position of the first word of the subject; otherwise the starting word of the subject is retrieved from the appropriate noun group or clausal group data structure. Then, as documented in further detail in Appendix A1, for clauses which have a subject, the processor checks for certain initial patterns. When one of the specified patterns is identified, the clause is recognized as a SUBORDINATE clause starting with a subjunctive inversion; a clause having the form of a MATRIX clause but with a subject whose tag identifies it as a W-clause; a clause having the form of a MATRIX clause but lacking necessary punctuation so as to more probably be a W-clause; or, by default, a MATRIX clause.

If the clause has no subject, it is labeled as a bad clause for error processing unless an inspection of its verbal codes indicates an imperative interpretation. In that case it is labeled as a MATRIX clause. After processing of the UNDEFINED clauses, corrective processing is undertaken on the clauses which have been identified by the boundaries module as containing certain errors. Specifically, if a clause typed SUBORDINATE has no subject, it is relabeled a bad clause, and, if it does have a subject, the comparative adjective/adverb flag noted above is inspected and, if found, the first such clause of a pair is labeled a MATRIX clause. Certain other patterns, such as "as (clause) so (clause)" are detected, with the first clause being relabeled MATRIX.

For clauses which were initially typed as W-clauses a check is performed to determine if the clause is more accurately typed as an interrogative MATRIX. Finally, for clauses which were typed as COORDINATE clauses, a check is made to determine if the clause is actually an imperative clause with no subject (as indicated by its verbal tags and lack of subject) or, if it has no subject, a bad clause. A check is also made to see if it is a MATRIX clause of the form "either/neither (clause) or/nor (clause)". In that case the first clause is labeled as a MATRIX clause.

When the loop through the sorted clause structure ends, it returns control to the type defining module 176 (FIG. 14). Before returning control however, certain clause type patterns are examined for apParent clausal errors. Thus, if no clause in a sentence has been identified as a MATRIX clause, then an interrogative W-clause, if found, is relabeled as a MATRIX clause. Second, if a pair of MATRIX clauses has been found, the second MATRIX clause may be recognized as a comment clause by setting a flag. A comment clause is identified as a clause commencing to the right of another clause, separated from surrounding clauses by a comma, and consisting of only a simplex noun group subject and a simplex predicate. A special feature bit is set in the global clausal data structure when a comment clause is detected.

If the second MATRIX clause does not meet the conditions for being a comment clause, then the first clause is examined for certain word groupings (e.g., "not only (clause) but also (clause)"). If these constructions are detected, the second clause is retyped as a COORDINATING clause.

This completes the description of operation of the clausal analysis structure of a sentence analyzer according to the invention which operates on noun group and verb group structures derived from the tags of words of a natural language sentence. The clausal analyzer derives higher level relational information concerning the nature and relationship of clauses within the sentence. This derived data, in turn, serves as the basis for a number of grammatical rule checking procedures, examples of which will be described briefly below.

such procedure is the detection of clause-based grammatical errors. For example, the existence of a double negative violates the rules of English grammar if the two negative elements occur within the same clause. Thus, the grammar processor simply checks for the occurrence of two negation markers occurring within the bounds of a single clause to detect a violation of this rule.

An important clausal error detector is the concordance processor 178 indicated in FIG. 14. When the clause analyzer 170 has completed its processing of clause types the concordance processor 178 is called to verify the feature agreement properties of the identified clauses.

The feature concordance processor will be best understood following a brief description of basic noun-group/predicate concordance processing.

In order to effect the feature agreement determination, a "weight", described above in connection with PRED and in connection with the noun phrase boundary insertion routines of GcsPrsr, is generated for each simplex constituent and for complex constituents that do not result from coordination, as follows. The constituent (noun phrase or verb group) is initially assigned a weight of zero. Then, (a) if the current element of the constituent is marked for singular number agreement and is not a noun adjunct, and if the existing weight is non-negative, it is incremented by one; and (b) if the current element of the constituent is marked for plural number agreement, and is not a noun adjunct, then if the existing weight is not positive, it is decremented by one. If the current element of the constituent under examination is neutral with respect to number agreement, then it makes no contribution to the value of that constituent's weight. Finally, if the current element is not neutral with respect to number agreement, but is a noun adjunct, then it is treated as if it were neutral. Various special cases may also be detected and subject to special weight assignments at this stage. For example, the word "You" may be given a large (negative) weight e.g. (−5) in order to automatically resolve any inconsistencies in favor of a plural agreement which it must have. For a like reason, cardinal numbers may be treated similarly. Alternatively, cardinals may be treated as generally neutral (e.g. "a five pound hammer") and assigned a plural weight only in the event the constituent contains at least one other plural word.

This process results in a "weight" associated with each noun phrase or verb group ("constituent"), which is then used to determine which words of the text are identified as erroneous so as to cause display of an error message associated with the word.

The error message is determined as follows. Briefly, if a noun phrase and its corresponding verb group do not agree in number, one or more error messages are identified to suggest one or more corrections. The error messages are linked for display with the inconsistent words and with related messages. If the processor identifies a particular feature error, only the error message for that error is retained and the alternative messages are deleted.

If the weight of a given constituent is equal to zero then it makes no contribution to the process of error-message linking, and it cannot resolve which one of two constituents not agreeing in number is the correct one. This is because a zero-weight constituent either contains no elements that are not neutral with respect to number agreement, or contains two or more such elements, at least one pair of which is inconsistent (i.e., consists of one element that is singular and another that is plural).

In the latter case, if there is more than one singular element and more than one plural element, then error message structures are generated for every word that may be in error, even if the constituent-internal evidence suggests that one interpretation can be favored—e.g., if the singular forms outnumber the plural forms—all error messages are generated and linked together as appropriate. Feature agreement evidence external to the constituent is preferably then inspected to effect the interpretation of its contents. If, however, there is only one element that is inconsistent with respect to the number-agreement features of the other non-neutral elements then this element is taken to be in error without further analysis and only the suggested correction for that one element is generated. On the other hand, if the weight of a given constituent is non-zero, then it is consistent with respect to number agreement and, if n is the absolute value of the constituent's weight, it contains n elements that are not neutral with respect to number agreement. If the weight is positive, then all of these elements are singular with respect to number agreement; if it is negative, then they are all plural.

By way of example, the sentence "This man are here." (which is tagged and bracketed as: "$[_S[_{NP}$DT NN $_{NP}]$ $[_{VG}$BER RB $_{VG}]_S]$") is analyzed as consisting of a single simplex NP (referred to as "NP$_1$") in subject position and a corresponding finite simplex predication (referred to as "VG$_1$"). It fits the structural description of the basic simplex sentence "$[_S$NP$_s$ VG$_s${+finite}$_s]$". However, NP$_1$ is marked as being singular with respect to number agreement and VG$_1$ is marked as being plural. In the absence of any further information concerning the number-agreement features of these constituents, an error message would have to be generated for both the subject and the predicate. However, an examination of their constituent weights as calculated above reveals that NP$_1$ (with a weight of +2) contains two singular elements and that VG$_1$ (with a weight of −1) contains only one plural element. Based on this information an error message is generated to indicate that the plural verb form in VG$_1$ should actually be singular. Since a single element was inconsistent, only one error message is generated for this sentence, and no error message linkages are necessary.

As a further example, the sentence "These man are here." which is tagged and bracketed as "$[_S[_{NP}$ DTS NN $_{NP}$] [$_{VG}$ BER RB $_{VG}$]$_S$]" is processed to determine a similar error message, though this is accomplished through a somewhat different series of steps. As in the previous sentence, this sentence is also analyzed as a simplex sentence of the form "[$_S$ NP$_s$ VG$_s${+finite}$_S$]-"—however, in this case NP$_1$ is recognized as being internally inconsistent with respect to number agreement. VG$_1$ is recognized as being plural with respect to number agreement. The internal inconsistency of NP$_1$ results from the fact that "these" is plural and "man" is singular. Because of this, the noun phrase procedure described above which closes non-lexical NPs and determines their internal consistency generates error messages for both words (suggesting "this" as a substitution for "these" and "men" as a substitution for "man"), and also assigns a weight of zero to the NP.

This feature agreement property is encoded by providing two feature bits which are denoted B$_5$ and B$_6$ from the coding scheme employed in one prototype system. B$_6$ is set to "1" to indicate that special feature agreement processing is required; "0" otherwise. B$_5$ is a derived bit, which is set to "0" if the syntactic entity is neutral with respect to number agreement. Because the NP is internally inconsistent, the value of the fifth and sixth bits of N-FEATS feature string associated with NP is set to '01'B. Since the value of B$_5$ in this string is '0'B, this NP is taken as being neutral with respect to number agreement (and therefore will be concorded with either singular or plural VGs); however, it is differentiated from the "true" neutral NPs by the fact the B$_6$ is equal to '1'B (rather than '0'B), and is therefore recognized as subject to special processing.

The subject-verb concordance checker detects the number-agreement inconsistency in the previous sentence above from the fact that the B$_5$ value for both NP$_1$ and VG$_1$ was equal to '1'B—indicating that both constituents were non-neutral with respect to number agreement—and that their B$_6$ values differed. It does not, however, apply the subject-verb concord test to the current sentence because of the fact that NP$_1$ is marked by B$_5$ as being neutral with respect to number agreement. However, since this neutrality is a consequence of the NPs internal inconsistency, the following processing is done in order to apply the number-agreement facts of VG$_1$ in an attempt to resolve the internal inconsistency of NP$_1$. The weight of VG$_1$ is inspected and since it is neutral, then the set of all possible erroneous forms in NP$_1$ which have been flagged by the NP processing, is left unchanged. However, VG$_1$ is determined to have a non-zero weight, indicating that it has number-agreement information to contribute. Since the weight of VG$_1$ is negative, the VG is plural with respect to number agreement.

In the presently preferred implementation o a processor, the number-agreement features of internally inconsistent constituents are controlled by the external context, that is, by reference to the number agreement features of related constituents. Thus, where NP$_1$ is inconsistent, and VG$_1$ is consistent, the number of VG$_1$ is controlling.

In the example just described, the weight of VG$_1$ is negative, and therefore the finite verb form that it contains concords with any plural elements in NP$_1$. The subject-verb concord processor effects feature-correction by scanning the error messages associated with the elements of NP$_1$ and deleting those associated with elements that are marked for plural number agreement. The error message associated with "these" is deleted, leaving only the error message associated with "man" to be displayed. The deletion of the error message associated with "these" is performed by the deletion of all linkages to it, so that when the single error message remaining in the sentence—that associated with "man'-'—is displayed, it no longer is linked to any other error message.

Figure 16:
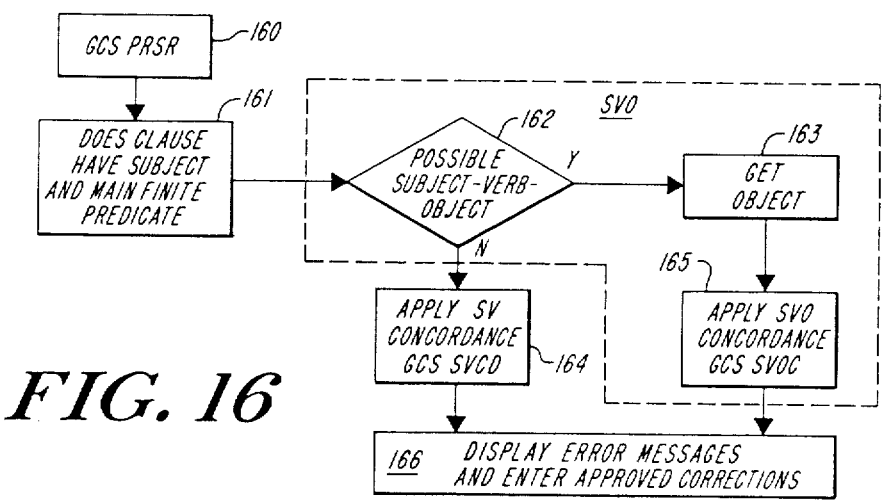
FIG. 16 is a flow chart of feature concordance processing.

FIG. 16 shows the operation of this post-parsing feature agreement processing. The object is to identify the existence of feature agreement errors, to identify if possible what the proper correction is by weighing the evidence of feature number of the sentence constituents which must agree, and, where a correct number is identified, to delete extraneous error messages previously generated by the parser for inconsistent constituents, to create appropriate error messages if none were previously created, and to display the remaining error messages so that, when the operator approves a suggested correction, the corresponding correct tag and feature information is inserted.

As shown in FIG. 16, the parsing module is entered at stage 160 when the processor has identified noun phrases and verb groups, and identified tentative subjects, as described in detail above. A determination is made at 161 whether the current clause has a subject and main finite predicate. Optionally, at 162 an additional determination may be made whether subject-verb-object concordance rules may be applicable; (e.g., whether the verb is a form of "to be"). In the latter case, at 163 the sentence is scanned to locate the object. The subject-verb concordance rules described above, or subject-verb-object concordance rules such as described below, are then applied at 164, 165, respectively, as appropriate. If the concordance checking identifies a "correct" number, then the error messages which are not consistent with this correct number are deleted by deletion of their error message pointers, and the remaining error messages are then displayed at 166.

If it is desired to also perform subject-verb-object feature agreement processing, the following scheme may be employed. The weight of each component (subject, verb or object) is inspected and agreement processing is performed depending on the type of inconsistency detected. If two components agree in number and one disagrees, the number features of the two agreeing components are controlling, so that the inconsistent component is changed and an error message is generated for each non-neutral element of that component. If no two non-neutral components agree, no corrective action is taken beyond the error message display. Finally, if there is some, but not enough, information to identify a "correct" number feature (e.g. if one component—S, V, or O—is either neutral or inconsistent and the other two components disagree) the processor may inspect the weights of the non-neutral components and take the weight of greatest absolute value as indicating the correct number. In that case error messages are generated for each non-neutral component consistent with the "correct" number.

Thus, a proposed SVO concord processor weighs the feature agreement evidence of each constituent to determine error correction messages for user entry of correct text words for grammatically correct text.

By way of example, the sentence "The man are computer programmers." would be analyzed as follows.

First, the parsing, predication and clausal modules determine tags and insert noun, verb and sentence boundaries to annotate the sentence as "[$_S$ [$_{NP}$ AT NN $_{NP}$] [$_{VG}$ BER $_{VG}$] [$_{NP}$ NN NNS $_{NP}$] $_S$]" as described in detail above. This simplex sentence fits the general simplex sentence template

[$_S$ NP$_S$ VG$_S$ {+finite} NP$_S$ $_S$], with the first noun phrase NP$_1$ receiving a singular weight (+1), and VG$_1$ and the second noun phrase NP$_2$ each receiving plural weight (−1).

The hypothesized SVO concordance processor would recognize the feature number (singular, plural, plural) of the S, V and O as requiring generation of error messages for each non-neutral element of the subject suggesting changes of the word to a plural form. Thus an error message is generated suggesting the change of "man" to its plural form "men", and the SVO concordance processor returns control to its calling procedure.

It will be appreciated that an implementation of a SVO processor as described above may further provide for special processing to recognize the occurrence of irregular constructions involving, for example, collective nouns which may take singular or plural number agreement in different contexts.

This completes the description of the major structural units of a prototype embodiment of a sentence analyzer according to the present invention, and of the interrelation of the various units of such processor for annotating encoded text and processing the text to detect grammatical errors.

The invention being thus described, other examples and embodiments of the invention will occur to those skilled in the art, and all such embodiments and examples are within the spirit of the invention, as defined by the following claims.

APPENDIX A0 to patent application for SENTENCE ANALYZER of applicants Henry Kucera et al Mar 13 16:23 1987   Gcl_strt.c  Page 1

```
/*---------------------------------------------------------------*
*                                                                 *
* COPYRIGHT (c) Houghton Mifflin Company Grammar Correction System. *
* This work is protected by the United States Copyright Laws as an *
* unpublished work and by Houghton Mifflin as trade secret information. *
* Solely for use in licensee software as permitted by written license *
* from Houghton Mifflin.  Disclosure of contents and of embodied  *
* programs or algorithms prohibited.                              *
*                                                                 *
*-----------------------------------------------------------------*

*-----------------------------------------------------------------*
*                                                                 *
*       Gcl_strt.c - Gcl_strt                                     *
*                                                                 *
*-----------------------------------------------------------------*
*
        Synopsis:
        ret = Gcl_strt(cl_ndx, lastleft);
        RETCODE ret;       ;return code
        INT2B cl_ndx;      ;Gcgroups index clause to analyze
        INT2B lastleft;    ;Gpsennode index of last leftward node to examine Description:
        This function examines material to the left of a clause core,
        up to and including the "lastleft" sen_node, in order to
        (1) identify leftward sen_nodes that should be included
        within the clause, and (2) identify the clause type, if possible.
        If appropriate nodes are found and the clause type determined,
        the resulting values are stored in the global clause structure's
        s_spnts[0] and cl_type fields; if not, the function returns
        without taking further action.

Returns:
        OKRET    -    if no errors are detected
        ERRET    -    if the function parameter is erroneous
        other    -    none Cautions:
        None.

Creation Date:
        dd-mmm-86       NTW

Change Record:
        dd-mmm-yy       xxx     Description of change.

*-----------------------------------------------------------------*
*/ include "Gparshdr.c"

RETCODE
```

```
Gcl_strt(cl_ndx, lastleft)
INT2B cl_ndx;           /* Gcgroups index clause to analyze */
INT2B lastleft;         /* Gpsennode index of last leftward node to examine */
{
        CLAUSE *pcurc;                  /* pointer to current clause struct */
        INT2B cur_start;                /* current starting index of clause */
        INT2B firstleft;                /* index of first word left of clause */
        CHAR word[SWORDMAX + 1];        /* word associated with sen_node */
        INT2B i;                        /* index, I suppose */
        INT2B j;                        /* still another supposed index */
        INT2B end;                      /* loop end marker */
        UINT2B tag;                     /* best tag of word */
        INT2B dom;                      /* Gngroups index of dominating NP */
        INT2B subj;                     /* index of subject of current clause */
        INT2B cc_ndx;                   /* index of leftward CC (or comma CC) */
        INT2B comma_ndx;                /* index of leftward comma */
        FLAG has_word;                  /* TRUE if NP has looked-for word */
        FLAG skip_it;                   /* TRUE if CC should be skipped over */

/* initialize clause pointer and boundary variables,
        ** and see if there is any leftward material to examine.
        ** If there is none, there is nothing for this function to do */ if ((pcurc = Gcgroups[cl_ndx]) == NULL)
                return(ERRET);                          /* EXIT FUNCTION */ cur_start = pcurc->s_spnts[0];
        if (cur_start <= lastleft)
                return(OKRET);                          /* EXIT FUNCTION */
        else
                firstleft = cur_start - 1;

/* scan leftward for that/wh word introducing subordinate or "w" clause;
        ** or semi-colon, colon, coordinate conjunction, or special adverb
        ** introducing coordinate clause */ skip_it = FALSE;
        i = firstleft;
        while (i >= lastleft) { tag = Gpsennode[i]->best_tag;

if (tag == SEMI_COLON || tag == COLON_TAG) {

/* include this punctuation mark in the clause */
                        pcurc->cl_type = CO_CLAUSE;
                        pcurc->s_spnts[0] = i;
                        break;                          /* EXIT LOOP */
                }
                else if (tag == COMMA_TAG) {

/* if this is an unpaired comma, treat it as a
                        ** clause boundary; if it is the second comma of
                        ** a pair, skip over the material between the commas
                        ** and advance the index to the first comma */
                        comma_ndx = NEGONE;
                        for (j = i - 1; j >= lastleft; --j) {
                                if (Gpsennode[j]->best_tag == COMMA_TAG) {
                                        comma_ndx = j;
                                        break;          /* exit loop */
                                }
                        }
                        if (comma_ndx > NEGONE) {
                                i = comma_ndx;
                        }
                        else {  /* break out of main loop */
                                break;                  /* EXIT LOOP */
                        }
```

```
else if (tag == CC && skip_it == FALSE) {

/* if this conjunction is "either/neither" and is
        ** coordinating a complex subject rather than
        ** two clauses ("either John or Mary . . ."),
        ** it does not represent the clause starting point.
        ** Set skip_it to TRUE, then reprocess the word */ if (Gscmp(Gpsennode[i]->low_word, "either") == 0 ||
            Gscmp(Gpsennode[i]->low_word, "neither") == 0) { if (Gscmp(Gpsennode[i]->low_word, "either")
                                                == 0) {
                        strcpy(word, "or");
                }
                else {
                        strcpy(word, "nor");
                } has_word = FALSE;
                subj = pcurc->subj;
                if (subj > NEGONE && subj < 100 &&
                    Gngroups[subj]->n_cpnts[0] > NEGONE) { end = Gngroups[subj]->n_spnts[1];
                        for (j = Gngroups[subj]->n_spnts[0];
                                j <= end; ++j) {
                                        if (Gscmp(Gpsennode[j]->
                                                low_word, word) == 0){
                                                has_word = TRUE;
                                                break;
                                        }
                                }
                } if (has_word) { /* go back to top of loop */
                        skip_it = TRUE;
                        continue;
                }
                else { /* the CC is coordinating clauses,
                        ** but make a note for the future */
                                if (Gscmp(Gpsennode[i]->low_word,
                                                "either") == 0) {
                                        pcurc->cl_feats |= HAS_EITHER;
                                }
                                else {
                                        pcurc->cl_feats |= HAS_NEITHER;
                                }
                }
        }
        /* if we haven't skipped the word, set type and start */ pcurc->cl_type = CO_CLAUSE;
        if (i > lastleft &&
            Gpsennode[i - 1]->best_tag == COMMA_TAG) { pcurc->s_spnts[0] = i - 1; /* include comma */
        }
        else {
                pcurc->s_spnts[0] = i;
        }                                         /* EXIT LOOP */
        break;
}
else if (tag == CS) {
```

```
        if (lastleft > 0 &&
            i > lastleft &&
            Gpsennode[i - 1]->bndry & NP_CLOSE &&
            !(Gpsennode[i - 1]->best_tag >= PN &&
              Gpsennode[i - 1]->best_tag <= PPX) ) {

/* look for pattern <[punct] NP as/that/though>
                ** introducing a subordinate clause.
                ** (". ., expert in economics that he is . .")
                ** If found, start clause at the beginning
                ** of the noun phrase */ strcpy(word, Gpsennode[i]->low_word);
                if (Gscmp(word, "as")     == 0 ||
                    Gscmp(word, "that")   == 0 ||
                    Gscmp(word, "though") == 0) { for (j = i - 1; j >= lastleft; --j) {
                                if (Gpsennode[j]->bndry &
                                                NP_OPEN) {
                                        break;
                                }
                        }
                        if (j > lastleft &&
                            (Gpsennode[j - 1]->best_tag ==
                                                COMMA_TAG ||
                             Gpsennode[j - 1]->best_tag ==
                                                COLON_TAG ||
                             Gpsennode[j - 1]->best_tag ==

SEMI_COLON) ) { pcurc->cl_type = SUB_CLAUSE;
                                pcurc->comp =  i;
                                pcurc->s_spnts[0] = j;
                        }
                }
        }

/* if the immediately preceeding processing did not
        ** move the boundary to the left of the CS, set the
        ** boundary either at the CS or at a CC to its left */ if (pcurc->s_spnts[0] > i) { cc_ndx = NEGONE;
                if (i > lastleft) {
                        Gcl_cc(i - 1, lastleft, &cc_ndx);
                } if (cc_ndx > NEGONE) {

/* there was a CC to the left */
                        pcurc->cl_type = CO_CLAUSE;
                        pcurc->s_spnts[0] = cc_ndx;
                        pcurc->cl_feats |= HAS_CS;
                }
                else {  /* stick with the CS we found at i */ pcurc->cl_type = SUB_CLAUSE;
                        pcurc->comp =  i;
                        pcurc->s_spnts[0] = i;
                }
        } break;                                  /* EXIT LOOP */
}
else if (tag == WRB) {
```

```
                pcurc->cl_type = W_CLAUSE;
                pcurc->comp = i;
                pcurc->s_spnts[0] = i;
                break;                                  /* EXIT LOOP */
        }
        else if (tag == WDT || tag == WPO ||
                 tag == WPS || tag == WPpos) { pcurc->cl_type = W_CLAUSE;
                pcurc->comp = i;
                if (i > lastleft &&
                    Gpsennode[i - 1]->best_tag == IN) {

/* include the preposition in the clause */
                        pcurc->s_spnts[0] = i - 1;
                }
                else { pcurc->s_spnts[0] = i;
                }
                break;                                  /* EXIT LOOP */
        }
        else if (tag == RB &&
                 (Gscmp(Gpsennode[i]->low_word, "then") == 0 ||
                  Gscmp(Gpsennode[i]->low_word, "otherwise") == 0 ||
                  Gscmp(Gpsennode[i]->low_word, "hence") == 0 )) {

/* these three adverbs introduce a coord clause */ pcurc->cl_type = CO_CLAUSE;

if (i > lastleft &&
                    Gpsennode[i - 1]->best_tag == COMMA_TAG) {

/* include the comma within the clause */
                        pcurc->s_spnts[0] = i - 1;
                }
                else {  /* check for a CC further to the left */ cc_ndx = NEGONE;
                        if (i > lastleft) {
                                Gcl_cc(i - 1, lastleft, &cc_ndx);
                        } if (cc_ndx > NEGONE) {
                                pcurc->s_spnts[0] = cc_ndx;
                        }
                        else {
                                pcurc->s_spnts[0] = i;
                        }
                } break;                                  /* EXIT LOOP */
        }
        else if (Gpsennode[i]->bndry & PP_CLOSE) {

/* move index to first word of prepositional phrase */
                while (i >= lastleft) {
                        if (Gpsennode[i]->bndry & PP_OPEN) {
                                break;  /* EXIT INNER LOOP */
                        }
                        else {
                                --i;
                        }
                }
        }
        else if (Gpsennode[i]->bndry & NP_CLOSE) {

/* move index to first word of dominating noun phrase */
                j = Gpsennode[i]->vnmark;
                while ((dom = Gngroups[j]->n_dom_lk) > NEGONE) {
                        j = dom;
                }
                i = Gngroups[j]->n_spnts[0];
```

```
                /* scan further to left */

--i;
                skip_it = FALSE;

}   /* end for loop */

/* if the boundary and type have been determined above,
    ** exit without any further processing */ if (i >= lastleft) {
            return(OKRET);                                  /* EXIT FUNCTION */
    }

/* look for special conditions not examined above */ if (Gpsennode[firstleft]->best_tag == JJR ||
        Gpsennode[firstleft]->best_tag == RBR) {

/* look for the pattern < , the  JJR/RBR >
            ** ("The bigger they are <, the harder> they fall")
            ** introducing a subordinate clause */ if (firstleft > lastleft &&
                Gscmp(Gpsennode[firstleft - 1]->low_word, "the") == 0) { pcurc->cl_feats |= HAS_JJR;

if ((firstleft - 1) > lastleft &&
                        Gpsennode[firstleft - 2]->best_tag == COMMA_TAG) { pcurc->cl_type = SUB_CLAUSE;
                            pcurc->s_spnts[0] = firstleft - 2;
                    }
                    else {  /* check for CC further to the left */ cc_ndx = NEGONE;
                            if ((firstleft - 1) > lastleft) {
                                    Gcl_cc(firstleft - 1,lastleft, &cc_ndx);
                            } if (cc_ndx > NEGONE) {
                                    pcurc->s_spnts[0] = cc_ndx;
                                    pcurc->cl_type = CO_CLAUSE;
                                    pcurc->cl_feats |= HAS_CS;
                            }
                            else {  /* clause begins with <"the" JJR/RBR> */ pcurc->cl_type = SUB_CLAUSE;
                                    pcurc->s_spnts[0] = firstleft - 1;
                            }   /* end checking special conditions */ return(OKRET);

}   /* Gcl_strt */

/*      end of file Gcl_strt.c            */
/*------------------------------------------------------------------------*
 *                                                                        *
 * COPYRIGHT (c) Houghton Mifflin Company Grammar Correction System.      *
 * This work is protected by the United States Copyright Laws as an       *
 * unpublished work and by Houghton Mifflin as trade secret information.  *
 * Solely for use in licensee software as permitted by written license    *
 * from Houghton Mifflin.  Disclosure of contents and of embodied         *
 * programs or algorithms prohibited.                                     *
 *                                                                        *
 *------------------------------------------------------------------------*
```

```
/*---------------------------------------------------------------------*
 *                                                                     *
 *      Gcl_type.c - Gcl_type                                          *
 *                                                                     *
 *---------------------------------------------------------------------*
 *
        Synopsis:
        ret = Gcl_type();
        RETCODE ret;                    ;return code Description:
        This function identifies clause types, and checks for badly formed
        clauses.

At the time this function is called, some clauses may have had
        a type assigned by Gcl_strt, which handles attachment of words
        to the left of the clause subject-predicate core. Certain words
        attached by Gcl_strt imply a clause type, which is then assigned.
        In other cases the type remains undefined. Gcl_type assigns
        a type to all undefined clauses, and also re-examines clauses typed
        by Gcl_strt to check for errors.

Returns:
        OKRET     -      if no errors are detected
        ERRALLOC  -      if Gaddserr cannot allocate an error structure other     -      returns from sublevel functions Cautions:
        None.

Creation Date:
        24-feb-87       NTW

Change Record:
        dd-mmm-yy       XXX     Description of change.

*---------------------------------------------------------------------*
 */ include "Gparshdr.c"
RETCODE
Gcl_type()
{
        INT2B last_ndx;              /* Gcgroups index of last clause allocated */
        REG INT2B curc;              /* current clause; loop index */
        UINT2B subj_tag;             /* tag of first word in subject */
        UINT2B pred_tag;             /* tag of finite verb in predicate */
        INT2B verb_ndx;              /* index of finite verb in predicate */
        CLAUSE *pcurc;               /* pointer to current clause structure */
        FLAG have_matrix;            /* TRUE if a matrix clause encountered */
        INT2B s_start;               /* starting point of clause subject */

CHAR  firstwrd[SWORDMAX + 1];   /* first word in clause or sentence */
        PSERR perrstr;                  /* pointer to system error structure */
        RETCODE ret;                    /* return value from called functions */

/* initialize variables, then loop through all the sorted clauses */ have_matrix = FALSE;
        last_ndx = Gpsen_str->sen_count - 1;
        for (curc = 0; curc <= last_ndx; ++curc) {

/* get pointer to current clause structure */ pcurc = Gcgroups[curc];
```

```
        /* get subject tag */ if (pcurc->subj == NEGONE) {
                subj_tag = XX;
        }
        else if (pcurc->subj < 100) {
                subj_tag = Gpsennode[Gngroups[pcurc->subj]->
                                        n_spnts[0]]->best_tag;
        }
        else if (pcurc->subj < 200) {
                subj_tag = Gpsennode[Gfgroups[pcurc->subj - 100]->
                                        f_spnts[0]]->best_tag;
        }
        else if (pcurc->subj < 300) {
                subj_tag = Gpsennode[Gcgroups[pcurc->subj - 200]->
                                        s_spnts[0]]->best_tag;
        }

/* get index and tag of predicate finite verb */ if (pcurc->pred == NEGONE) {
                verb_ndx = NEGONE;
                pred_tag = XX;
        }
        else {
                verb_ndx = Gvgroups[pcurc->pred]->v_marks;
                pred_tag = Gpsennode[verb_ndx]->best_tag;
        }
/* DETERMINE CLAUSE TYPE */
if (pcurc->pred == NEGONE) {

/* ain't no way this clause can be good */
        pcurc->cl_type = BAD_CLAUSE;
}
else if (pcurc->cl_type == UNDEF_CLAUSE) {

/* the current clause could be
        ** (1) a matrix, or
        ** (2) a subordinate (with subjunctive inversion), or
        ** (2) one of the "w_clause" group
        ** (relative, red. relative, that/wh, red. that/wh) */ if (pcurc->cl_feats & IS_NESTED) {

/* must be relative or red. relative w_clause */
                /* ?? IS THIS ALWAYS TRUE ?? */ if (pcurc->subj > NEGONE)
                        pcurc->cl_type = W_CLAUSE;
                else
                        pcurc->cl_type = BAD_CLAUSE;
        }
        else { /* clause is not nested */

/* get clause first word and subject start */ strcpy(firstwrd,
                        Gpsennode[pcurc->s_spnts[0]]->low_word);

if (pcurc->subj <= NEGONE) {
                        s_start = NEGONE;
                }
                else if (pcurc->subj < 100) {
                        s_start =
                                Gngroups[pcurc->subj]->n_spnts[0];
                }
                else if (pcurc->subj < 200) {
                        s_start =
                                Gfgroups[pcurc->subj - 100]->f_spnts[0];
```

```
       else {
               s_start =
                 Gcgroups[pcurc->subj - 200]->s_spnts[0];
       } if (pcurc->subj > NEGONE) { if (last_ndx > 0 &&
                   Gscmp(Gpsennode[Glastsen]->
                         low_word, "?") != 0 &&
                   s_start == pcurc->s_spnts[0] + 1 &&
                   (Gscmp(firstwrd, "had") == 0 ||
                    Gscmp(firstwrd, "should") == 0 ||
                    Gscmp(firstwrd, "were") == 0)) {

/* if there is more than one
                       ** clause, and if the sentence
                       ** is not interrogative, and
                       ** if the clause starts with
                       ** "had/should/were" immediately
                       ** followed by subject, it is
                       ** a subjunctive inversion
                       ** subordinate clause */ pcurc->cl_type = SUB_CLAUSE;
               }
               else if (curc == 0) {

/* leftmost: call it matrix */
                       pcurc->cl_type = MAT_CLAUSE;
                       have_matrix = TRUE;
               }
               else if (have_matrix &&
                        (subj_tag == WRB ||
                         subj_tag == WDT ||
                         subj_tag == WPO ||
                         subj_tag == WPS ||
                         subj_tag == WPpos)) {

/* NOTE: some of these tags are
                       ** here because of possible
                       ** misdisambiguationism */
                       pcurc->cl_type = W_CLAUSE;
               }
               else if (have_matrix &&
                        pcurc->s_spnts[0] > 0 &&
                        Gpsennode[pcurc->s_spnts[0] - 1]->
                                 best_tag != COMMA_TAG) {

/* clause not separated from
                       ** leftward clause by comma:
                       ** assume that is is a reduced
                       ** relative or that/wh clause */ pcurc->cl_type = W_CLAUSE;
               }
               else {  /* by default, a matrix */ pcurc->cl_type = MAT_CLAUSE;
                       have_matrix = TRUE;
               }
       }
       else {  /* clause has no subject. This is okay
               ** if the clause is imperative (the
               ** verb is, or could be, tagged xxI) */ if (pred_tag == VBI ||
                   pred_tag == DOI ||
                   pred_tag == HVI ||
```

```
                                        pred_tag == BEI) (

/* an imperative matrix */
                                        pcurc->cl_type = MAT_CLAUSE;
                                        have_matrix = TRUE;
                                }
                                else if (verb_ndx > NEGONE &&
                                    (Gpsennode[verb_ndx]->s_codes[2]
                                                                == VBI ||
                                     Gpsennode[verb_ndx]->s_codes[2]
                                                                == DOI ||
                                     Gpsennode[verb_ndx]->s_codes[2]
                                                                == HVI ||
                                     Gpsennode[verb_ndx]->s_codes[2]
                                                                == BEI ||
                                     Gpsennode[verb_ndx]->s_codes[3]
                                                                == VBI ||
                                     Gpsennode[verb_ndx]->s_codes[3]
                                                                == DOI ||
                                     Gpsennode[verb_ndx]->s_codes[3]
                                                                == HVI ||
                                     Gpsennode[verb_ndx]->s_codes[3]
                                                                == BEI)) ( /* probable imperative matrix */
                                        pcurc->cl_type = MAT_CLAUSE;
                                        have_matrix = TRUE;
                                }
                                else (  /* all other verbs need subj */ pcurc->cl_type = BAD_CLAUSE;
                                }
                        }

} /* end else clause is not nested */
        }
        else if (pcurc->cl_type == SUB_CLAUSE) ( /* the current clause could be
                ** (1) a subordinate, as advertised, or
                ** (2) a matrix mis-typed as a subordinate */ if (pcurc->subj <= NEGONE) (

/* subordinate clause must have a subject */
                        pcurc->cl_type = BAD_CLAUSE;

}
                else (  /* check for mis-typed matrix */

/* check for a "the JJR/RBR" sequence:
                        ** the first of these is a matrix */ if (have_matrix == FALSE &&
                            (pcurc->cl_feats & HAS_JJR) &&
                            curc < last_ndx &&
                            (Gcgroups[curc + 1]->cl_feats & HAS_JJR))( /* a mis-typed matrix:  re-type it */
                                pcurc->cl_type = MAT_CLAUSE;
                                have_matrix = TRUE;
                        }
                        else (  /* check for a clause which
                                ** (1) is sentence initial,
                                ** (2) begins with "as," and
                                ** (3) the next clause begins with
                                **     <so> or <, so>
                                ** this clause is a matrix */
```

```c
                        if (curc == 0 &&
                            curc < last_ndx &&
                            Gscmp(Gpsennode[pcurc->s_spnts[0]]
                                ->low_word, "as") == 0 &&
                            (Gscmp(Gpsennode[
                                Gcgroups[curc + 1]->s_spnts[0]]
                                ->low_word, "so") == 0 ||
                            Gscmp(Gpsennode[
                                Gcgroups[curc + 1]
                                ->s_spnts[0] + 1]
                                ->low_word, "so") == 0)) { pcurc->cl_type = MAT_CLAUSE;
                            have_matrix = TRUE;
                        }
                    }
            }
        }
        else if (pcurc->cl_type == W_CLAUSE) {

/* the current clause could be
            ** (1) a w_clause, as claimed, or
            ** (2) a mis_typed interrogative matrix */ if (pcurc->subj == NEGONE) {

/* w_clause must have subject */
                pcurc->cl_type = BAD_CLAUSE;
            }
            else { /* see if this is the only clause */ if (last_ndx == 0) { pcurc->cl_type = MAT_CLAUSE;
                    have_matrix = TRUE;
                }
            }
        }
        else if (pcurc->cl_type == CO_CLAUSE) {

/* the current clause could be
            ** (1) a coordinate, as the label says, or
            ** (2) a matrix mis-typed as a coordinate */ if (pcurc->subj <= NEGONE) {
                if (!(pred_tag == VBI || pred_tag == DOI ||
                      pred_tag == HVI || pred_tag == BEI)){

/* coord w/o subj must be imperative */
                    pcurc->cl_type = BAD_CLAUSE;
                }
            }
            else { /* see if this is a mislabled matrix: if
                ** (1) it begins with "either/neither" and
                ** (2) the next clause begins with "or/nor"
                ** then the current clause is a matrix */ if (curc < last_ndx &&
                    ((pcurc->cl_feats & HAS_EITHER) &&
                    (Gscmp(Gpsennode[
                        Gcgroups[curc + 1]->s_spnts[0]]
                        ->low_word, "or") == 0 ||
                    Gscmp(Gpsennode[
                        Gcgroups[curc + 1]->s_spnts[0] + 1]
                        ->low_word, "or") == 0)) ||
                    ((pcurc->cl_feats & HAS_NEITHER) &&
                    (Gscmp(Gpsennode[
                        Gcgroups[curc + 1]->s_spnts[0]]
                        ->low_word, "nor") == 0 ||
```

```
                                        Gscmp(Gpsennode[
                                            Gcgroups[curc + 1]->s_spnts[0] + 1]
                                            ->low_word, "nor") == 0))) ( pcurc->cl_type = MAT_CLAUSE;
                                        have_matrix = TRUE;
                                    )
                                )
                            )
                    else ( /* illegal clause type */ if ((ret = Gbestwrd(Gpsennode[0], firstwrd)) != OKRET)(
                                    return(ret);
                            )
                            if (Gaddserr(&perrstr, MPARS) != OKRET) (
                                    return(ERRALLOC);
                            )
                            sprintf(perrstr->err_msg[0],
    "Gcl_type: bad type.  Clause: %d, type: %d, sentence start: %s\n",
     Gcgroups[curc], pcurc->cl_type, firstwrd);

)

) /* end loop through sorted clause structures */

/* RE-EXAMINE CLAUSE TYPING IF THERE ARE APPARENT CLAUSAL ERRORS */

/* if there is no matrix clause, check for an interrogative w_clause */

Mar 12 16:16 1987  Gcl_type.c Page 8 if (have_matrix == FALSE) ( for (curc = 0; curc <= last_ndx; ++curc) ( pcurc = Gcgroups[curc];
                            if (pcurc->cl_type == W_CLAUSE &&
                                !(pcurc->cl_feats & IS_NESTED) &&
                                Gscmp(Gpsennode[Glastsen]->low_word, "?") == 0) ( pcurc->cl_type = MAT_CLAUSE;
                                    have_matrix = TRUE;
                                    break;                /* exit loop */
                            )
                    )
            )

/* if we have any MATRIX-MATRIX pairs, re-examine the typing.
            ** Gcl_2mat may re-type the second matrix, or mark it as a "comment" */ if (Gpsen_str->sen_count >= 2 &&
                Gcgroups[0]->cl_type == MAT_CLAUSE &&
                Gcgroups[1]->cl_type == MAT_CLAUSE) ( if ((ret = Gcl_2mat(0)) != OKRET)
                            return(ret);
            )
            else if (Gpsen_str->sen_count == 3 &&
                    Gcgroups[0]->cl_type == SUB_CLAUSE &&
                    Gcgroups[1]->cl_type == MAT_CLAUSE &&
                    Gcgroups[2]->cl_type == MAT_CLAUSE) ( if ((ret = Gcl_2mat(1)) != OKRET)
                            return(ret);
            )
            else if (Gpsen_str->sen_count == 3 &&
                    Gcgroups[0]->cl_type == MAT_CLAUSE &&
                    Gcgroups[2]->cl_type == MAT_CLAUSE) (
```

```
     /* mark the last clause as a "comment," if appropriate */
     if ((ret = Gcl_cmnt(2)) != OKRET)
            return(ret);
   } return(OKRET);

} /* Gcl_type */

/*       end of file Gcl_type.c        */
```

What is claimed is:

1. Apparatus for the analysis of digitally encoded natural language, comprising
   means for receiving encoded data representative of a body of natural language words such encoded data including for each word at least a provisionally-assigned syntactic tag of the word,
   noun group identifying means operative on the encoded data for identifying noun groups and producing noun data structures representative thereof which augment the encoded data,
   verb group identifying means operative on said encoded data augmented by the noun data structures for identifying verb groups and for producing predicate data structures representative thereof which further augment the encoded data, and
   clausal analysis means operative on said encoded data augmented by said noun data structures and said predicate data structures for identifying well formed clauses of said body of words.

2. Apparatus according to claim 1, further comprising concordance means for determining agreement among syntactic parts of a clause identified by the clausal analysis means.

3. Apparatus according to claim 1, further comprising
   means for identifying a syntax error, and
   means for displaying an error message indicative of the identified error.

4. Apparatus according to claim 3 wherein the noun group identifying means identifies the words of a noun phrase from the ordering of syntactic tags of words.

5. Apparatus according to claim 4, wherein the noun group means comprises means for identifying noun phrase boundaries and a feature agreement property.

6. Apparatus according to claim 5, wherein the verb group identifying means comprises a finite state automaton operative on words not lying within the boundaries of a simplex noun phrase.

7. Apparatus according to claim 6, wherein the clausal analysis means comprises means for identifying clause type.

8. Apparatus according to claim 7, wherein the means for identifying a syntax error further comprises concordance means for determining agreement among parts of a clause identified by the clausal analysis means.

9. Apparatus according to claim 8, wherein the means for identifying a syntax error further comprises means for displaying an error correction message keyed to a detected error type.

10. Apparatus for the grammatical analysis of digitally encoded natural language text, such apparatus comprising
    code annotation means for annotating each word of a text with data codes, such code annotation means including a stored dictionary of words together with associated data codes, wherein the data codes include tag codes representing possible grammatical or syntactic used of a word, and feature codes representing agreement properties of a word and such code annotation means also including means for looking up words of the text in the dictionary to identify said tag and feature codes for annotating the words, and
    noun phrase means operative on the identified tag codes of successive words for identifying noun phrases from the ordering of the tag codes.

11. Apparatus according to claim 10, further comprising
    means for processing the feature codes of the annotated words of a noun phrase identified by the noun phrase means to determine feature agreement consistency.

12. Apparatus according to claim 11, further comprising
    complex phrase means for identifying complex noun phrases from the noun phrases identified by the noun phrase means.

13. Apparatus according to claim 12, wherein the complex phrase means include means for processing feature codes of constituent noun phrases to determine feature codes for a complex noun phrase.

14. Apparatus according to claim 13, further comprising
    predicate means for identifying verb groups of the text.

15. Apparatus according to claim 14, further comprising
    means for identifying feature agreement inconsistencies between verb groups and noun phrases.

16. Apparatus according to claim 15, further comprising
    means for determining an error message associated with a feature agreement inconsistency and for displaying the error message.

17. Apparatus according to claim 16, further comprising
    means for determining a correct replacement word for a word of text having feature agreement inconsistency,
    said means for determining and displaying an error message including means for receiving the correct replacement word so as to display the correct replacement word together with the error message associated with the feature agreement inconsistency.

18. Apparatus according to claim 15, wherein the means for processing the identified predicates and noun phrases comprises means for checking subject-verb concordance.

19. Apparatus according to claim 15 wherein the means for processing the identified predicates and noun phrases comprises means for checking subject-verb-object concordance.

20. Apparatus according to claim 10, further comprising predicate means, for identifying verb groups in the annotated text, and clausal analysis means for operating on identified verb groups to determine the structure of clauses in the annotated text.

21. Apparatus according to claim 20, wherein said clausal analysis means includes means for identifying types of clauses.

22. Apparatus according to claim 21, further comprising means for identifying clause-based errors of syntax.

23. A method of analyzing a digitally encoded body of natural language words for grammatical well-formedness, such method comprising, in order, the steps of (I) annotating the words with candidate syntactic tags to produce a data structure, (II) inspecting the ordering of the candidate tags to identify noun groups and producing noun data representative thereof thereby augmenting the data structure, (III) processing the annotated words and the noun data to identify verb groups and producing predicate data representative thereof further augmenting the data structure, and (IV) processing the further augmented data structure to identify well-formed clauses of said body of words.

24. A method according to claim 223, further comprising the step of displaying an error message when one of said steps of inspecting or processing detects probable errors.

25. A method according to claim 24, wherein the step of displaying an error message includes the step of displaying a message identifying a probable error together with a correction therefor.

26. An automated parser for processing digitally encoded natural language text, such parser comprising means for annotating words of text with possible grammatical tags, noun means operative on the annotated words of text for identifying noun phrases and for further annotating the text with noun phrase data, predicate means operative on said annotated words of text and noun phrase data for identifying verb groups and for further annotating the text with verb group data, and error detection means included in said means for annotating, said noun means and said predicate means, for identifying text errors during operation of the aforesaid three means and displaying an indication thereof, whereby errors in text are identified for correction during processing stages of ascending structural complexity thereby permitting in-process correction of errors and parsing of unedited text without breakdown of the processing operations or requiring excessive processing time.

27. A method for grammatical analysis of digitally encoded natural language text, such method comprising the steps of providing an automated means for annotating each word of a text with data codes, such means including a stored dictionary of words together with associated data codes, wherein the data codes include tag codes representing possible grammatical or syntactic uses of a word, and feature codes representing agreement properties of a word and such automated means being operative for looking up words of the text in the dictionary to identify said tag and feature codes thereby annotating the words, and providing an automated noun phrase identifier which successively inspects the order of the identified tag codes of successive words to identify noun phrases of the text.

28. A method for an automated parsing of digitally encoded natural language text, such method comprising the steps of annotating words of text with possible grammatical tags, identifying noun phrases and further annotating the text with noun phrase data, identifying verb groups and further annotating the text with verb group data, identifying text errors during the aforesaid three steps and displaying an error indication thereof, and correcting the displayed errors in text during processing stages of ascending structural complexity thereby permitting automated parsing of unedited text without breakdown of the processing operations or requiring excessive processing time.

* * * * *

UNITED STATES PATENT AND TRADEMARK OFFICE
CERTIFICATE OF CORRECTION

PATENT NO. : 4,864,502

DATED : September 5, 1989

INVENTOR(S) : Henry Kucera and Alwin B. Carus

It is certified that error appears in the above-identified patent and that said Letters Patent is hereby corrected as shown below:

Column 7, line 49, please delete "various" and insert --variable--.

Column 9, line 41, please delete "work" and insert --word--.

Column 9, line 43, please delete "work" and insert --word--.

Column 59, line 70, please delete "used" and insert --uses--.

Column 61, line 27, please delete "223" and insert --23--.

Signed and Sealed this

Fourteenth Day of July, 1992

Attest:

DOUGLAS B. COMER

*Attesting Officer*     *Acting Commissioner of Patents and Trademarks*